United States Patent
Chien et al.

(10) Patent No.: US 10,536,701 B2
(45) Date of Patent: *Jan. 14, 2020

(54) VIDEO CODING USING ADAPTIVE MOTION VECTOR RESOLUTION

(75) Inventors: Wei-Jung Chien, San Diego, CA (US); Peisong Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1209 days.

This patent is subject to a terminal disclaimer.

(21) Appl. No.: 13/536,218

(22) Filed: Jun. 28, 2012

(65) Prior Publication Data

US 2013/0003849 A1 Jan. 3, 2013

Related U.S. Application Data

(60) Provisional application No. 61/504,150, filed on Jul. 1, 2011, provisional application No. 61/554,398, filed on Nov. 1, 2011.

(51) Int. Cl.
*H04N 19/13* (2014.01)

(52) U.S. Cl.
CPC .................................. *H04N 19/13* (2014.11)

(58) Field of Classification Search
CPC ........ H04N 19/51; H04N 19/52; H04N 19/61; H04N 19/91; H04N 19/105; H04N 19/513; H04N 19/523

(Continued)

(56) References Cited

U.S. PATENT DOCUMENTS

| 5,847,776 A | * | 12/1998 | Khmelnitsky et al. ....... 348/699 |
| 7,088,271 B2 | | 8/2006 | Marpe et al. |

(Continued)

FOREIGN PATENT DOCUMENTS

| CN | 1469632 A | 1/2004 |
| CN | 1832575 A | 9/2006 |

(Continued)

OTHER PUBLICATIONS

Marpe et al, "Context-Based Adaptive Binary Arithmetic Coding in the H.264/AVC Video Compression Standard," IEEE Transactions on Circuits and Systems for Video Technology, Jul. 2003, vol. 13 (7), pp. 620-636.*

(Continued)

*Primary Examiner* — Sath V Perungavoor
*Assistant Examiner* — Daniel Chang
(74) *Attorney, Agent, or Firm* — Schumaker & Seiffert, P.A.

(57) ABSTRACT

In one example, a device for coding video data includes a video coder configured to configured to code information representative of whether an absolute value of an x-component of a motion vector difference value for a current block of video data is greater than zero, code information representative of whether an absolute value of a y-component of the motion vector difference value is greater than zero, when the absolute value of the x-component is greater than zero, code information representative of the absolute value of the x-component, when the absolute value of the y-component is greater than zero, code information representative of the absolute value of the y-component, when the absolute value of the x-component is greater than zero, code a sign of the x-component, and when the absolute value of the y-component is greater than zero, code a sign of the y-component.

33 Claims, 9 Drawing Sheets

(58) Field of Classification Search
USPC ......... 348/699; 375/240.02, 240.16; 382/236
See application file for complete search history.

(56) References Cited

U.S. PATENT DOCUMENTS

| | | | |
|---|---|---|---|
| 7,286,710 B2 | 10/2007 | Marpe et al. | |
| 7,408,990 B2 | 8/2008 | Lin et al. | |
| 7,616,692 B2 | 11/2009 | Holcomb et al. | |
| 8,045,616 B2 | 10/2011 | Sekiguchi et al. | |
| 8,175,159 B2 | 5/2012 | Suzuki et al. | |
| 9,491,480 B2 | 11/2016 | Lim et al. | |
| 2005/0013498 A1 | 1/2005 | Srinivasan, Sr. et al. | |
| 2005/0036551 A1 | 2/2005 | Winger et al. | |
| 2005/0038837 A1 | 2/2005 | Marpe et al. | |
| 2005/0052294 A1 | 3/2005 | Liang et al. | |
| 2005/0053295 A1* | 3/2005 | Holcomb | 382/236 |
| 2007/0211802 A1* | 9/2007 | Kikuchi et al. | 375/240.16 |
| 2008/0198934 A1 | 8/2008 | Hong et al. | |
| 2009/0016626 A1 | 1/2009 | Zhang et al. | |
| 2009/0074073 A1 | 3/2009 | Srinivasan et al. | |
| 2009/0154563 A1 | 6/2009 | Hong et al. | |
| 2010/0284456 A1* | 11/2010 | Frank | 375/240.02 |
| 2011/0080954 A1 | 4/2011 | Bossen et al. | |
| 2011/0200108 A1 | 8/2011 | Joshi et al. | |
| 2011/0206125 A1 | 8/2011 | Chien et al. | |
| 2012/0328022 A1 | 12/2012 | Sasai et al. | |
| 2013/0202047 A1 | 8/2013 | Song et al. | |
| 2013/0287110 A1 | 10/2013 | Suzuki et al. | |
| 2014/0341297 A1 | 11/2014 | Chien et al. | |

FOREIGN PATENT DOCUMENTS

| | | |
|---|---|---|
| CN | 1950832 A | 4/2007 |
| EP | 1075148 A2 | 2/2001 |
| EP | 1377067 A1 | 1/2004 |
| EP | 2645715 A4 | 5/2014 |
| JP | 2008211697 A | 9/2008 |
| JP | 2011109364 A | 6/2011 |
| JP | 5362129 B2 | 12/2013 |
| KR | 20060121808 A | 11/2006 |
| RU | 2412556 C2 | 2/2011 |
| WO | 2005027496 A2 | 3/2005 |
| WO | 2007020977 A1 | 2/2007 |
| WO | 2011021911 A2 | 2/2011 |
| WO | 2011034148 A1 | 3/2011 |
| WO | 2011046587 A1 | 4/2011 |
| WO | 2011047994 A1 | 4/2011 |
| WO | 2011053054 A9 | 1/2012 |
| WO | 2011111954 A3 | 1/2012 |
| WO | 2012053796 A2 | 4/2012 |
| WO | 2012096551 A2 | 7/2012 |
| WO | 2012176450 A1 | 12/2012 |
| WO | 2013159330 A1 | 10/2013 |

OTHER PUBLICATIONS

Chien et al., "CE12: Adaptive Motion Vector Resolution from Qualcomm," JCTVC-D394, Jan. 16, 2011 (Jan. 16, 2011).*
An et al., "Progressive MV Resolution", JCTVC-F125, Torino, Jul. 2011.
Bross et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, 259 pp.
Bross et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d21, 290 pp.
Bross et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, 261 pp.
Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.
Bross et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pp.
Chien et. al., "Adaptive resolution on motion vector difference," Joint Collaborative Team on Video Coding (JCT-VC) of ITU-T SG16 WP3 and ISO/IEC JTC1/SC29/WG11, JCTVC-F567, 6th Meeting: Torino, IT, Jul. 14-22, 2011, 4 pp.
Chien et. al., "CE12: Adaptive Motion Vector Resolution from Qualcomm", JCTVC-D394, Daegu, Jan. 2011, 4 pp.
ITU-T H.264, Series H: Audiovisual and Multimedia Systems, Infrastructure of audiovisual services—Coding of moving video, Advanced video coding for generic audiovisual services, Mar. 2010, 669 pp.
ITU-T H.223, Series H: Audiovisual and Multimedia Systems "Multiplexing Protocol for Low Bit Rate Multimedia Communication," Jul. 2001, 74 pp.
ITU-T H.263, Series H: Audiovisual and Multimedia Systems Infrastructure of audiovisual service—Coding of moving video: Video coding for low bitrate communication, (Jan. 2005), 226 pp.
ITU-T H.264, Series H: Audiovisual and Multimedia Systems, Infrastructure of audiovisual services—Coding of moving video, Advanced video coding for generic audiovisual services, The International Telecommunication Union, Jun. 2011, 674 pp.
Sasai et al., "Modified MVD coding for CABAC", Joint Collaborative Team on Video Coding (JCT-VC) of ITU-T SG16 WP3 and ISO/IEC JTC1/SC29/WG11, 6th Meeting: Torino, IT, Jul. 14-22, 2011, 6 pp.
Wiegand et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.
Wiegand et al., "WD2: Working Draft 2 of High-Efficiency Video Coding", No. JCTVC-D503, Jan. 28, 2011 (Jan. 28, 2011), XP002679642, Retrieved from the Internet: URL: http://wftp3.itu.int/av-arch/jctvc-site/2011_01_D_Daegu, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Chen, et al., "Efficient bit-rate estimation technique for CABAC", Circuits and Systems, 2008. APCCAS 2008. IEEE Asia Pacific Conference on, IEEE, Piscataway, NJ, USA, Nov. 30, 2008 , pp. 514-517, XP031405046.
Chien, et al., "CE3: Adaptive resolution on motion vector difference", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG. 16); URL: http://wftp3.itu.int/av-arch/jctvc-site/, No. JCTVC-G727, XP030110711 (5 pages).
International Search Report and Written Opinion—PCT/US2012/045078—ISA/EPO—Oct. 4, 2012, 15 pp.
Sasai, et al., "Modified MVD coding for CABAC", MPEG Meeting; Jul. 18, 2011-Jul. 22, 2011; Torino; (Motion Picture Expert Group or ISO/IEC JTC1/SC29/WG11), Document: JCTVC-F423, No. m20851, XP030049414, 6 pp.
International Preliminary Report on Patentability from International Application No. PCT/US2012/045078, dated Jun. 17, 2013 10 pp.
Nguyen, et al., "Modified Binarization and Coding of MVD for PIPE/CABACU", JCT-VC Meeting, MPEG Meeting, Jul. 14-22, 2011, Torino, (Joint Collaborative Team on Video Coding of ISO/IEC JTC1/SC29/WG11 and ITU-TSG.16), URL: http://wftp3.itu.int/av-arch/jctvc-site/, No. JCTVC-F455, XP030009478, 2 pp.
Sze et al., "Joint Algorithm-Architecture Optimization of CABC" Joint Coloborative Team on Video Coding (JCT-VC0 of ITU-T SG16 WP3 and ISO/IEC/JTC1/SCWG11, 5th Meeting, Mar. 16-23, 2011; JCTVC-E324, 7 pp.

(56) References Cited

OTHER PUBLICATIONS

Davies T., et al., "Suggestion for a Test Model", JCTVC-A033, 1st Meeting, Apr. 15, 2010—Apr. 23, 2010, (Joint collaborative Team on Video Coding of ISO/IEC JTC1/SC297WG11 and ITU-TSG 16), Dresden, DE, XP030007526, May 7, 2010 (May 7,2010), pp. 1-30.

Dinh T.N., et al., "Side Information Generation Using Extra Information in Distributed Video Coding," IEEE International Symposium on Signal Processing and Information Technology, 2007, pp. 138-143. (Applicant points out, in accordance with MPEP 609.04(a), that the year of publication, 2007, is sufficiently earlier than the effective U.S. fling date, so that the particular month of publication is not in issue.).

Guo L., et al., "Adaptive motion vector resolution with implicit signaling," Image Processing (ICIP), 2010 17th IEEE International Conference, Sep. 26-29, 2010, pp. 2057-2060.

JCT-VC, "Test Model under Consideration", JCTVC-A205, Joint Collaborative Team on Video Coding of ITU-T SG16 NP3 and ISO/IEC JTC1/SC29NVG11, 1st meeting Apr. 15-23, 2010, Dresden, Germany, 171 pages.

\* cited by examiner

VIDEO CODING USING ADAPTIVE MOTION VECTOR RESOLUTION

This application claims the benefit of U.S. Provisional Application No. 61/504,150, filed Jul. 1, 2011, and U.S. Provisional Application No. 61/554,398, filed Nov. 1, 2011, the entire contents of each of which are hereby incorporated by reference.

TECHNICAL FIELD

This disclosure relates to video coding, and more particularly, to coding of video data for motion compensation in video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

SUMMARY

In general, this disclosure provides techniques for jointly coding motion vector difference values for x- and y-components of a motion vector. Jointly coding motion vector difference values may refer to a process in which information representative of the x- and y-components of the motion vector difference value is coded or decoded together during the coding process, e.g., by interleaving values for the x- and y-components or by coding a single value representative of both the x- and y-components of the motion vector difference value. In some examples, the information representative of the x- and y-component of the motion vector difference may include information representative of whether the x- and/or y-components of the motion vector difference are greater than zero, and information representative of the sign of the x- and/or y-components of the motion vector difference value. Certain information, such as the sign and magnitude of the x- and/or y-components may be signaled conditionally based upon whether the magnitude x- or y-components of the motion vector difference value are greater than zero. This disclosure also provides techniques for signaling the precision of motion vectors. The motion vectors may have sub-pixel precision, for example one-quarter sub-pixel precision or one-eighth sub-pixel precision.

In one example, a method of coding video data includes coding information representative of whether an absolute value of an x-component of a motion vector difference value for a current block of video data is greater than zero, coding information representative of whether an absolute value of a y-component of the motion vector difference value is greater than zero, when the absolute value of the x-component of the motion vector difference value is greater than zero, coding information representative of the absolute value of the x-component of the motion vector difference value, when the absolute value of the y-component of the motion vector difference value is greater than zero, coding information representative of the absolute value of the y-component of the motion vector difference value, when the absolute value of the x-component of the motion vector difference value is greater than zero, coding a sign of the x-component of the motion vector difference value, and when the absolute value of the y-component of the motion vector difference value is greater than zero, coding a sign of the y-component of the motion vector difference value.

In another example, an apparatus includes a video coder configured to code information representative of whether an absolute value of an x-component of a motion vector difference value for a current block of video data is greater than zero, code information representative of whether an absolute value of a y-component of the motion vector difference value is greater than zero, when the absolute value of the x-component of the motion vector difference value is greater than zero, code information representative of the absolute value of the x-component of the motion vector difference value, when the absolute value of the y-component of the motion vector difference value is greater than zero, code information representative of the absolute value of the y-component of the motion vector difference value, when the absolute value of the x-component of the motion vector difference value is greater than zero, code a sign of the x-component of the motion vector difference value, and when the absolute value of the y-component of the motion vector difference value is greater than zero, code a sign of the y-component of the motion vector difference value.

In another example, a computer program product includes a computer-readable medium having stored thereon instructions that, when executed, cause one or more processors of a device for coding video data to code information representative of whether an absolute value of an x-component of a motion vector difference value for a current block of video data is greater than zero, code information representative of whether an absolute value of a y-component of the motion vector difference value is greater than zero, when the absolute value of the x-component of the motion vector difference value is greater than zero, code information representative of the absolute value of the x-component of the motion vector difference value, when the absolute value of the y-component of the motion vector difference value is greater than zero, code information representative of the absolute value of the y-component of the motion vector difference value, when the absolute value of the x-component of the motion vector difference value is greater than zero, code a sign of the x-component of the motion vector difference value, and when the absolute value of the y-component of the motion vector difference value is greater than zero, code a sign of the y-component of the motion vector difference value.

In another example, a device includes means for coding a value representative of whether a motion vector of the current block of video data has a first sub-pixel precision or a second sub-pixel precision, wherein the second sub-pixel precision is greater than the first sub-pixel precision, and when the motion vector has the second sub-pixel precision, when the x-component of the motion vector difference value is not equal to zero, and when the y-component of the motion vector difference value is not equal to zero, wherein coding information representative of the absolute value of the x-component of the motion vector difference value and coding information representative of the absolute value of the y-component of the motion vector difference value comprises coding a jointly coded value representative of both the x-component of the motion vector difference value and the y-component of the motion vector difference value.

The details of one or more examples are set forth in the accompanying drawings and the description below. Other features, objects, and advantages will be apparent from the description and drawings, and from the claims.

DETAILED DESCRIPTION

Figure 1:
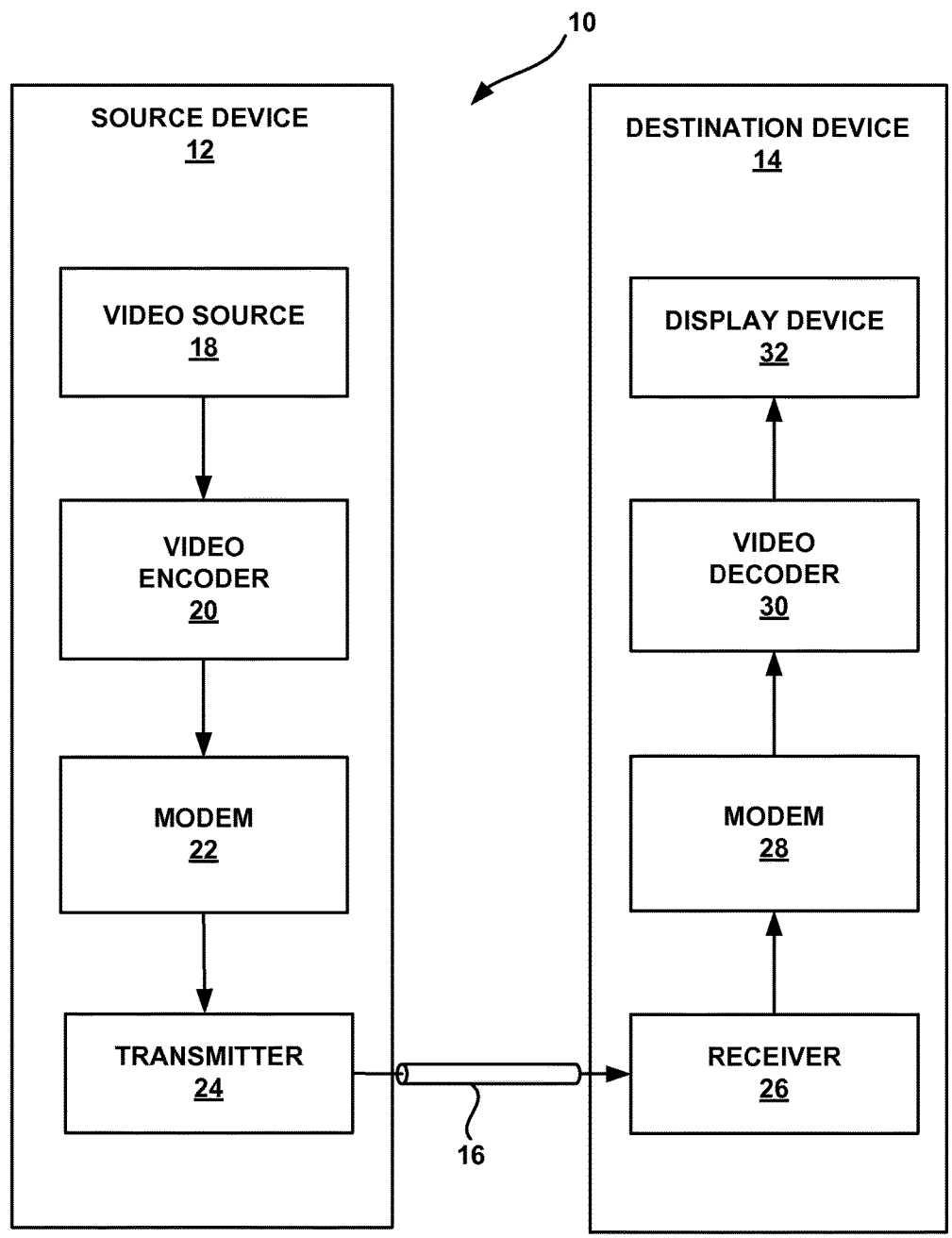
FIG. 1 is a block diagram illustrating one example of a video encoding and decoding system consistent with the techniques of this disclosure.

In general, this disclosure describes techniques for coding data for motion vector difference values during video coding. Video data includes a sequence of frames (or pictures) played in rapid succession to simulate motion. Each frame of video data may be partitioned into blocks. During video coding, and more specifically inter-prediction, a device such as a video encoder or a video decoder, may predict the pixel values of a block. The video encoder or decoder may base the predictions for the block on the pixel values of a block from another frame or from the pixel values of a neighboring block.

For intra-prediction, a video encoder may indicate the displacement of a reference block using a motion vector. The motion vector may have an x-component and a y-component. The x- and y-components of the motion vector may indicate a displacement with sub-pixel precision, such as one-half-pixel precision, one-quarter-pixel precision, or one-eighth-pixel precision. To achieve sub-pixel precision, a video encoder or decoder may use a technique, such as interpolation, to determine the sub-pixel values at the locations indicated by the motion vector. After determining the x- and y-components of the motion vector, a video encoder may calculate motion vector difference (MVD) values for the motion vector components relative to a motion vector predictor.

This disclosure generally provides techniques for jointly coding motion MVD values. In this disclosure, jointly coding may refer to coding techniques in which information related to the x- and y-components of a motion vector difference value are interleaved, as opposed to coding all the information related to one of the x- or y-components before coding any information related to the second component of the motion vector difference value. Joint coding may also refer to using one value to represent values for both of the x- and y-components. In addition, this disclosure also describes techniques for coding motion vector differences, which may have various sub-pixel precisions, e.g., quarter-pixel precision or eighth-pixel precision, and indicating the precisions of the motion vector differences and motion vectors associated with the motion vectors.

A video sequence includes one or more frames or pictures. Each of the pictures may be divided into one or more blocks, each of which may be individually coded. Efforts are in progress to produce a new encoding standard, currently referred to as high efficiency video coding (HEVC), and sometimes referred to as ITU H.265. This upcoming standard refers to a coding unit (CU) as a particular block of pixels including luminance data and chrominance data, where the luminance data has a resolution of 2N×2N and the chrominance data has a resolution of N×N. A coding unit may be divided into four equally sized, square, non-overlapping sub-coding units.

Each of the sub-coding units may also be divided in this way into further sub-coding units. A coding unit that is not divided into sub-coding units is referred to as a leaf-node coding unit. Leaf-node coding units may include prediction units (PUs) and transform units (TUs), where PUs represent prediction data and TUs represent residual data, that is, coded, pixel-by-pixel differences between prediction data and original, uncoded data, for pixels corresponding to the TU. As an example, PUs may be coded using an inter-prediction mode, in which a video encoder may calculate a motion vector for a PU using a motion estimation process. The video encoder may further signal an encoding mode for the PU and motion vector difference values for the calculated motion vector, as described in this disclosure.

Likewise, a video decoder may use information indicative of a prediction mode included in a coded bitstream to form prediction data for coded blocks. The data may further include a precision of the motion vector, as well as an indication of a fractional pixel position to which the motion vector points (for example, a one-eighth pixel position of a reference frame or reference slice).

A video coding device, such as a video encoder or a video decoder, may determine a predictive motion vector for a coding unit (such as a frame, slice, or block). The video coding device may use x- and y-components of the predictive motion vector (also referred to as a motion vector predictor) to calculate motion vector difference values of a motion vector for the current block. A video coding device may implement the techniques of this disclosure to jointly code motion vector difference values for motion vectors, which may have sub-pixel precision.

As discussed above, prediction data of a PU for forming a predictive block may be based on previously coded data of spatially neighboring CUs or CUs of temporally neighboring frames that have been previously coded. A video encoder may calculate a motion vector of a PU that indicates the location of a predictive block for a corresponding CU in a temporally separate, previously coded frame. The video encoder may further calculate a motion vector difference value for the motion vector to encode the motion vector. The motion vector difference value may generally correspond to a difference between the calculated motion vector, and a motion vector predictor. The motion vector for the current block may have an x-component (MV_x) for a horizontal offset, and a y-component (MV_y) for a vertical offset. The motion vector predictor may have an x-component of p_x and a y-component of p_y. Then, the motion vector predictor may be determined as <MV_x−p_x, MV_y−p_y>.

This disclosure provides techniques for jointly coding the x-component and the y-component of a motion vector difference value. In this disclosure, jointly coding may refer to coding techniques in which information related to the x- and y-components of a motion vector difference value are interleaved. Information related to the motion vector difference may include a value that represents whether or not a component of the motion vector difference is zero, one or more values that represent the sign value of the x- and/or y-components, and one or more values representative of the absolute value of the x- and y-components of the motion vector difference value, as some examples.

In accordance with the techniques of this disclosure, information related to one or both components of a motion vector difference value may be coded in an alternating fashion such that all information related to one component of the motion vector difference need not be coded before coding information related to the other component of the motion vector difference. In other words, an element of the x-component, such as whether the x-component has a magnitude greater than zero, may be interleaved with a corresponding element of the y-component. Jointly coding the x- and y-component of the motion vector difference contrasts with separately coding all the information related to one of the x- or y-components of a motion vector difference value, e.g., per the convention in ITU-T H.264. Jointly coding the x- and y-components of motion vector difference values may reduce the complexity of a video coding bitstream, which may result in a lower bitrate for coded video, as well as other potential advantages described herein.

In video coding according to the conventional ITU-T H.264 standard, motion vectors may have quarter-pixel (that is, one-quarter of pixel) precision. In some instances, eighth-pixel (that is, one-eighth pixel) precision may provide certain advantages. The High Efficiency Video Coding Test Model (HM) has the capability to form prediction units using motion vectors having eighth-pixel precision. In particular, the HM provides the ability to adaptively select either quarter-pixel precision or eighth-pixel precision. In this manner, motion vectors may have adaptive precision, also referred to as motion vector resolution. This fractional, or sub-integer, pixel precision may be used to define a motion vector with respect to a block of interpolated pixel values in the previously coded frame.

This disclosure also provides techniques for selecting particular instances in which one-quarter or one-eighth pixel precision motion vectors may be used, and how the motion vector precision may be signaled for a particular motion vector. In particular, the techniques of this disclosure are directed to selecting a motion vector resolution, and signaling the resolution using a motion resolution flag in some instances. This disclosure also provides techniques for jointly signaling the x- and y-components of a particular motion vector.

This disclosure describes several techniques related to motion vector coding, such as jointly coding motion vector difference values and signaling the precision, amplitude, and sign of one or more motion vector difference values. The techniques of this disclosure may be performed during a coding process performed by a video coding device, such as a video encoder or a video decoder. In this disclosure, the term "coding" refers to encoding that occurs at the encoder or decoding that occurs at the decoder. Similarly, the term coder refers to an encoder, a decoder, or a combined encoder/decoder (CODEC). The terms coder, encoder, decoder and CODEC all refer to specific machines designed for the coding (encoding and/or decoding) of video data consistent with this disclosure.

FIG. 1 is a block diagram illustrating an example video encoding and decoding system 10 that may utilize techniques for jointly signaling motion vectors. The motion vectors may have sub-pixel precision. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless. The techniques of this disclosure, however, which concern jointly coding, e.g., jointly signaling and/or interpreting a jointly signaled value, motion vector difference values, which may have sub-pixel precision, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless, wired, or storage media suitable for transmission or storage of encoded video data.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for signaling motion vector differences, which may have sub-pixel precision. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for jointly signaling motion vector differences precision may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to signaling motion vector differences, which may have sub-pixel precision. The information communicated over channel 16 may include syntax information defined by video encoder 20, which is also used by video decoder 30, that includes syntax elements that describe characteristics and/or processing of macroblocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

In other examples, source device 12 may store encoded data onto a storage medium, rather than transmitting the data. Likewise, destination device 14 may be configured to retrieve encoded data from a storage medium.

Video encoder 20 and video decoder 30 may operate according to a video compression standard, such as forthcoming ITU-T High Efficiency Video Coding (HEVC) standard, also referred to as "H.265". HEVC has not been made final, so video encoder 20 and decoder 30 may operate according to the latest draft of HEVC, referred to as the High Efficiency Video Coding Test Model (HM). The techniques of this disclosure, however, are not limited to any particular coding standard. Other examples include MPEG-2 and ITU-T H.263, and ITU-T H.264. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The HEVC standard is currently being formulated by the ITU-T Video Coding Experts Group (VCEG) together with the ISO/IEC Moving Picture Experts Group (MPEG) as the product of a collective partnership known as the Joint collaborative Team on Video Coding (JCT-VC). The HM presumes several capabilities of video coding devices over devices according to, previous coding standards, such as ITU-T H.264/AVC. For example, whereas H.264 provides nine intra-prediction encoding modes, HM provides as many as thirty-four intra-prediction encoding modes.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks, also referred to as CUs, within individual video frames in order to encode the video data. A video block may correspond to an LCU or a partition of an LCU. The video blocks may have fixed or varying sizes, and may differ in size according to a specified coding standard. Each video frame may include a plurality of slices. Each slice may include a plurality of LCUs, which may be arranged into partitions, also referred to as sub-CUs.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

HEVC refers to a block of video data as a coding unit (CU), which may include one or more prediction units (PUs) and/or one or more transform units (TUs). Syntax data within a bitstream may define a largest coding unit (LCU), which is a largest coding unit in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, PU, or TU.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

A leaf-CU may include one or more transform units (TUs). The transform units may be specified using a TU quadtree structure, as discussed above. That is, a split flag may indicate whether a leaf-CU is split into four transform units. Then, each transform unit may be split further into 4 sub TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the predictive values corresponding to the TU and the original block. The residual value may be transformed, quantized, and scanned. For inter coding, a video encoder may perform prediction at the PU level and may calculate a residual for each PU. The residual values corresponding to a leaf-CU may be transformed, quantized, and scanned. For inter coding, a leaf-TU may be larger or smaller than a PU. For intra coding, a PU may be collocated with a corresponding leaf-TU. In some examples, the maximum size of a leaf-TU may be the size of the corresponding leaf-CU.

In general, this disclosure uses the terms CU and TU to refer to leaf-CU and leaf-TU, respectively, unless noted otherwise. In general, the techniques of this disclosure relate to transforming, quantizing, scanning, and entropy encoding data of a CU. As an example, the techniques of this disclosure include selection of a transform to use to transform a residual value of an intra-predicted block based on an intra-prediction mode used to predict the block. This disclosure also uses the term "directional transform" or "designed transform" to refer to such a transform that depends on intra-prediction mode direction. That is, a video encoder may select a directional transform to apply to a transform unit (TU). As noted above, intra-prediction includes predicting a TU of a current CU of a picture from previously coded CUs and TUs of the same picture. More specifically, a video encoder may intra-predict a current TU of a picture using a particular intra-prediction mode.

During inter-prediction modes, video encoder 20 may determine a resolution, such as $\frac{1}{4}^{th}$ (one-quarter) or $\frac{1}{8}^{th}$ (one-eighth) pixel resolution, for a particular motion vector of a PU. This resolution may be determined using a technique that attempts to minimize the amount of error between a motion vector predictor, and a calculated motion vector for the PU of the CU, which may be a motion vector used to predict a displacement of a previously coded frame.

Video encoder 20 may determine a precision for the motion vector predictor, as well as a displacement of the vector, which may include an x-component, p_x, and a y-component, p_y. Video encoder 20 may calculate a motion vector difference corresponding to a difference between the motion vector predictor and the calculated motion vector. The motion vector difference (referred to as an "MVD"), may also have an x-component mvd_x and a y-component, mvd_y. Based on the magnitude of mvd_x, and mvd_y, the precision of the vectors (that is, one-quarter, or one-eighth pixel precision), and a threshold value, video encoder 20 may be configured to jointly code one or more values related to the x- and y-components of the motion vector difference value.

In accordance with the techniques of this disclosure, video encoder 20 and/or video decoder 30 may be configured to jointly code information related to motion vector differences for a block. Jointly coding may refer to coding techniques in which information related to the x- and y-components of a motion vector difference value are interleaved. The information may include information indicative of whether a magnitude, e.g., an absolute value, of the components is greater than zero, a sign for the components when the absolute value of the corresponding component is greater than zero, and information indicative of the absolute value of the component when the absolute value is greater than zero. Jointly coding the one or more values of the motion vector difference may reduce the complexity of a video coding bitstream, which may provide the advantages described herein. Similar to video encoder 20, video decoder 30 may receive an encoded video bitstream and may operate in an essentially reciprocal manner to video encoder 20. For example, video decoder 30 may receive coded values for a MVD, decode the jointly coded values, and calculate a motion vector for a block as a sum of the MVD and the motion vector predictor for the block.

In general, the x-component of a motion vector difference value may be referred to as "MVD_x," while the y-component of the motion vector difference value may be referred to as "MVD_y." The motion vector difference value for a block of video data, e.g., a PU, may be described by <MVD_x, MVD_y>. In general, MVD_x corresponds to the difference between an x-component of a motion vector for the block and an x-component of a motion vector predictor selected for the block. Likewise, MVD_y corresponds to the difference between a y-component of a motion vector for the block and a y-component of a motion vector predictor selected for the block. In this manner, video encoder 20 may calculate MVD_x by calculating the difference between the x-component of the motion vector for the block and the x-component of the motion vector predictor for the block, and MVD_y by calculating the difference between the y-component of the motion vector for the block and the y-component of the motion vector predictor for the block. Similarly, video decoder 30 may reconstruct the motion vector for the block by adding MVD_x to the x-component of the motion vector predictor, and by adding MVD_y to the y-component of the motion vector predictor. In other words, letting MV_x and MV_y represent the x-component and the y-component of the motion vector, respectively:

$$MVD\_x = MV\_x - p\_x; \text{ and} \quad (1)$$

$$MVD\_y = MV\_x - p\_y. \quad (2)$$

In some examples, video encoder 20 may code, e.g., signal, information for the motion vector difference value for the block jointly. For example, video encoder 20 may code information indicative of whether an absolute value of MVD_x, that is, |MVD_x|, is greater than zero, followed by information indicative of whether an absolute value of MVD_y, that is, |MVD_y|, is greater than zero. Such information may include, for example, flags representative of whether the x- and y-components of the MVD value are greater than zero, respectively. Video encoder 20 may also signal a value representative of a sign for MVD_x after signaling the flag representing whether MVD_y is greater than zero, assuming that the flag representing whether MVD_x is greater than zero indicates that MVD_x is, in fact, greater than zero. Video encoder 20 need not signal a sign for MVD_x when |MVD_x| is equal to zero.

Following either the value indicative of the sign for MVD_x (when signaled) or the information indicating whether |MVD_y| is greater than zero (when the sign of MVD_x is not signaled), video encoder 20 may signal a sign for MVD_y, again assuming that |MVD_y| is greater than zero. Moreover, video encoder 20 may then signal information representative of the absolute values of MVD_x and/or MVD_y, depending on whether either or both of MVD_x and MVD_y have absolute values greater than zero. Again, the information representative of the absolute values of MVD_x and MVD_y need not be signaled when the previously signaled values indicate that the absolute values of either or both of MVD_x and MVD_y are equal to zero.

In a similar manner, video decoder 30 may code (e.g., decode and interpret) data representative of whether MVD_x has an absolute value greater than zero, followed by data representative of whether MVD_y has an absolute value greater than zero. When the data indicates that the absolute value of MVD_x is greater than zero, video decoder 30 may be configured to then parse information representative of a sign for MVD_x. After parsing the information representative of the sign for MVD_x, or after determining that |MVD_x| is equal to zero, video decoder 30 may be configured to parse information representative of a sign for MVD_y, when the data indicates that the absolute value of MVD_y is greater than zero. Similarly, video decoder 30 may then parse information representative of absolute values for MVD_x and MVD_y, respectively, again assuming that the absolute values of MVD_x and MVD_y are greater than zero.

Video decoder 30 may be configured not to expect information relating to the sign and the absolute value of any component for which data indicates that the component has an absolute value not greater than zero (i.e., equal to zero). That is, video decoder 30 may be configured to parse other video data, e.g., other data for the block, without receiving or coding data for the signs and absolute values of MVD components that have absolute values equal to zero, as indicated by the earlier signaled information.

Jointly coding x- and y-components in this manner may achieve certain advantages over coding data for x- and y-components separately. For example, jointly coding the x- and y-components may increase throughput during entropy coding. As one particular example, jointly coding motion vector difference values may increase entropy coding throughput when video encoder 20 or decoder 30 uses CABAC to perform entropy coding. When information representative of the absolute value of the x- and y-components of motion vector difference values is jointly coded, video encoder 20 or decoder 30 may be able to entropy code the x- and y-components of the motion vector difference value together using the bypass mode of CABAC. The CABAC bypass mode may improve entropy coding throughput. Entropy coding the jointly coded information representative of the x- and y-components may enable video encoder 20 or decoder 30 to entropy code the both syntax elements in succession using the bypass mode of CABAC, which may improve entropy coding performance relative to separately entropy coding the x- and y-components. Although described in the preceding example with respect to CABAC, jointly coding the x- and y-components of motion vector difference values may also increase entropy coding efficiency and/or throughput when using other entropy coding techniques, such as VLC, and CAVLC.

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or the like.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
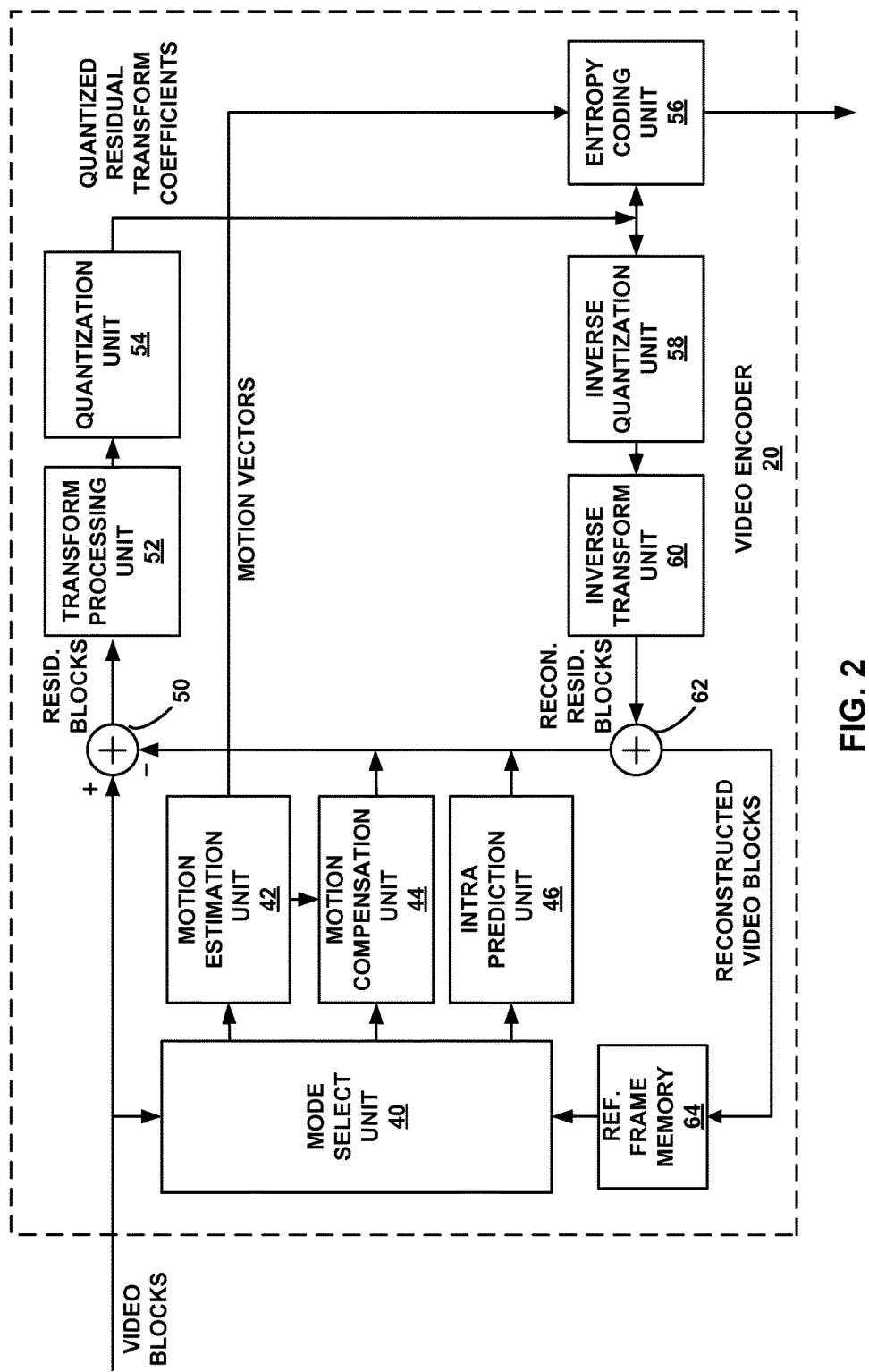
FIG. 2 is a block diagram illustrating one example of a video encoder consistent with the techniques of this disclosure.

FIG. 2 is a block diagram illustrating an example of video encoder 20 that may implement techniques for jointly signaling motion vectors, which may have sub-pixel precision. Video encoder 20 may perform intra- and inter-coding of blocks within video frames, including CUs, or sub-CUs of CUs. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes. Although components for inter-mode encoding are depicted in FIG. 2, it should be understood that video encoder 20 may further include components for intra-mode encoding. However, such components are not illustrated for the sake of brevity and clarity.

As shown in FIG. 2, video encoder 20 receives a current video block within a video frame to be encoded. In the example of FIG. 2, video encoder 20 includes motion compensation unit 44, motion estimation unit 42, reference frame memory 64, summer 50, transform processing unit 52, quantization unit 54, and entropy coding unit 56. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video frame, slice, or CU to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra prediction unit 46 may perform intra-predictive coding of the received video block relative to one or more neighboring blocks in the same frame or slice as the block to be coded to provide spatial compression. In accordance with the techniques described below, motion estimation unit 42 may determine a precision for a motion vector predictor, which may be determined based on an intra- or inter-prediction mode that mode select unit 40 has previously determined. Motion estimation unit 42, or another unit of video encoder 20, such as entropy coding unit 56, may further determine a motion vector difference corresponding to a difference between a motion vector predictor and a calculated motion vector for a PU of the received frame, slice, or CU. Entropy coding unit 56 may further code information related to the resolution, sign, and amplitude of a motion vector difference, as well as other information related to jointly coding motion vector as described below.

Mode select unit 40 may select one of the coding modes, intra or inter, e.g., based on error results, and provide the resulting intra- or inter-coded block to summer 50 to generate residual block data and to summer 62 to reconstruct the encoded block for use as a reference frame. In addition, mode select unit 40 may select a motion vector precision for a motion vector. For example, mode select unit 40 may select a motion vector precision for the motion vector based on rate-distortion optimization (RDO) associated with one-quarter sub-pixel and one-eighth sub-pixel precision motion vectors. Motion vectors with one-quarter pixel precision may require fewer bits to code relative to motion vectors with one-eighth pixel precision. However, a predictive block indicated with a motion vector coded with one-quarter pixel precision may result in a higher amount of residual information compared to a predictive block coded with one-eighth sub-pixel precision. Video encoder 20 may perform RDO in order to optimize number of bits (that is, the bitrate) used to code a particular motion vector against the residual information (distortion) associated with a difference between the predictive block indicated by the motion vector, and the block currently being coded. Based on the outcome of the RDO, mode select unit 40 may select the motion vector precision, e.g. one-quarter or one-eighth sub-pixel precision, that optimizes the rate-distortion tradeoff.

Motion compensation unit 44 may be needed to calculate sub-pixels, such as sub-pixels of reference frames, at various precisions, e.g. one-eighth and one-quarter sub-pixels. In order to interpolate sub-pixels, motion compensation unit 44 may utilize a variety of techniques. As examples, motion compensation unit 44 may utilize bilinear interpolation or utilize N-tap finite response filters (FIRs) to interpolate a sub-pixel. When a device such as motion compensation unit 44 calculates a value for a fractional pixel by averaging two pixels or sub-pixels, it may round, and/or scale the resulting value. In some cases, motion compensation unit 44 may average values for two sub-pixels which are the result of averaging to a sub-integer pixel Motion compensation unit 44 may calculate values for more sub-integer pixel positions, such as one-eighth pixel positions, by applying interpolation filters to sets of support. Support generally refers to values for one or more reference pixels, e.g., pixels in a common line or region. The pixels may correspond to full pixel positions or sub-integer pixel positions that were previously calculated. In some examples, motion compensation unit 44 may calculate values for sub-integer pixels using bilinear interpolation, and may use similar bilinear interpolation filters to calculate values for two or more different sub-integer pixel positions by applying the one or more of the bilinear interpolation filters to different sets of support for the respective sub-integer pixel positions.

In some other cases, motion compensation unit 44 may utilize an N-tap finite response filter (FIR) to interpolate sub-pixel values. A FIR, such as a 6-tap or 12-tap Wiener filter, may utilize nearby support pixel values to interpolate a sub-integer pixel value. A support pixel is a pixel or sub-pixel value used as an input to the FIR. A FIR may have one or more dimensions. In a one-dimensional FIR, a device such as motion compensation unit 44 may apply a filter to a number of support pixels or sub-pixels in a line, for example, horizontally, vertically, or at an angle. In contrast to a one-dimensional FIR, which may use support pixels in a straight line, a two-dimensional FIR, may use nearby support pixels or sub-pixels which form a square or rectangle to compute the interpolated pixel value.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in reference frame memory 64. Motion compensation unit 44 may also interpolate sub-integer pixels of the reference frame, e.g., an I-frame or a P-frame. As an example, motion vectors may be predicted from two lists of reference frames: list 0, which includes reference frames having a display order earlier than a current frame being encoded, and list 1, which includes reference frames having a display order later than the current frame being encoded. Therefore, data stored in reference frame memory 64 may be organized according to these lists.

Motion estimation unit 42 compares blocks of one or more reference frames from reference frame memory 64 to a block to be encoded of a current frame, e.g., a P-frame or a B-frame. When the reference frames in reference frame memory 64 include values for sub-integer pixels, a motion vector calculated by motion estimation unit 42 may refer to a sub-integer pixel location of one of the reference frames stored in reference frame memory 64. Motion estimation unit 42 and/or motion compensation unit 44 may also be configured to calculate values for sub-integer pixel positions of reference frames stored in reference frame memory 64 if no values for sub-integer pixel positions are stored in reference frame memory 64. Motion estimation unit 42 sends the calculated motion vector to entropy coding unit 56 and motion compensation unit 44. The reference frame block identified by a motion vector may be referred to as a predictive block. The motion vector that indicates the displacement of the predictive block relative to the current block being coded in the current frame may have an x-component of mvd_x and a y-component of mvd_y.

Motion compensation unit 44 may calculate prediction data based on the predictive block. Video encoder 20 forms a residual video block by subtracting the prediction data from motion compensation unit 44 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms, such as those defined by the H.264 standard, which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Jointly coding the x- and y-components of the motion vector difference values may allow entropy coding unit 56 to achieve higher entropy coding throughput when using CABAC. Entropy coding unit 56 may use the bypass mode of CABAC to increase the throughput of entropy coding the jointly coded x- and y-components of motion vector difference values relative to entropy coding separately coded x- and y-components of motion vector difference values. Following the entropy coding by entropy coding unit 56, the encoded video may be transmitted to another device or archived for later transmission or retrieval. In the case of context adaptive binary arithmetic coding, context may be based on neighboring macroblocks.

In some cases, entropy coding unit 56 or another unit of video encoder 20 may be configured to perform other coding functions, in addition to entropy coding. For example, entropy coding unit 56 may be configured to determine the CBP values for the macroblocks and partitions. Also, in some cases, entropy coding unit 56 may perform run length coding of the coefficients in a macroblock or partition thereof. In particular, entropy coding unit 56 may apply a zig-zag scan or other scan pattern to scan the transform coefficients in a macroblock or partition and encode runs of zeros for further compression. Entropy coding unit 56 also may construct header information with appropriate syntax elements for transmission in the encoded video bitstream.

In accordance with the techniques of this disclosure, quantization unit 54 and entropy coding unit 56 may jointly code motion vectors, which may have sub-pixel precision, as described below. In some examples, quantization unit 45 and entropy coding unit 56 may signal one or more flag values that represent whether the x- and/or y-components of a motion vector difference value are zero, one or more values that represent the sign of the x- and/or y-components when the components have absolute values not equal to zero, and information that represents the absolute value of the magnitude of the x- and y-components of the motion vector difference value when the components have absolute values not equal to zero. Quantization unit 45 and entropy coding unit 56 may also signal a motion resolution flag, which may represent the sub-pixel resolution of the motion vector, as well as a threshold value related to both the magnitude and the precision of the motion vector.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Video encoder 20 represents an example of a video encoder configured to encode video data representative of whether an absolute value of an x-component of a motion vector difference value for a current block of video data is greater than zero and to encode video data representative of whether an absolute value of a y-component of the motion vector difference value is greater than zero. Video encoder 20 may be configured to encode video data representative of the absolute value of the x-component of the motion vector difference value when the absolute value of the x-component of the motion vector difference value is greater than zero, and to encode video data representative of the absolute value of the y-component of the motion vector difference value when the absolute value of the y-component of the motion vector difference value is greater than zero. Video encoder 20 may also be configured to encode video data representative of a sign of the x-component of the motion vector difference value when the absolute value of the x-component of the motion vector difference value is greater than zero, and to encode a sign of the y-component of the motion vector difference value when the absolute value of the y-component of the motion vector difference value is greater than zero.

Figure 3:
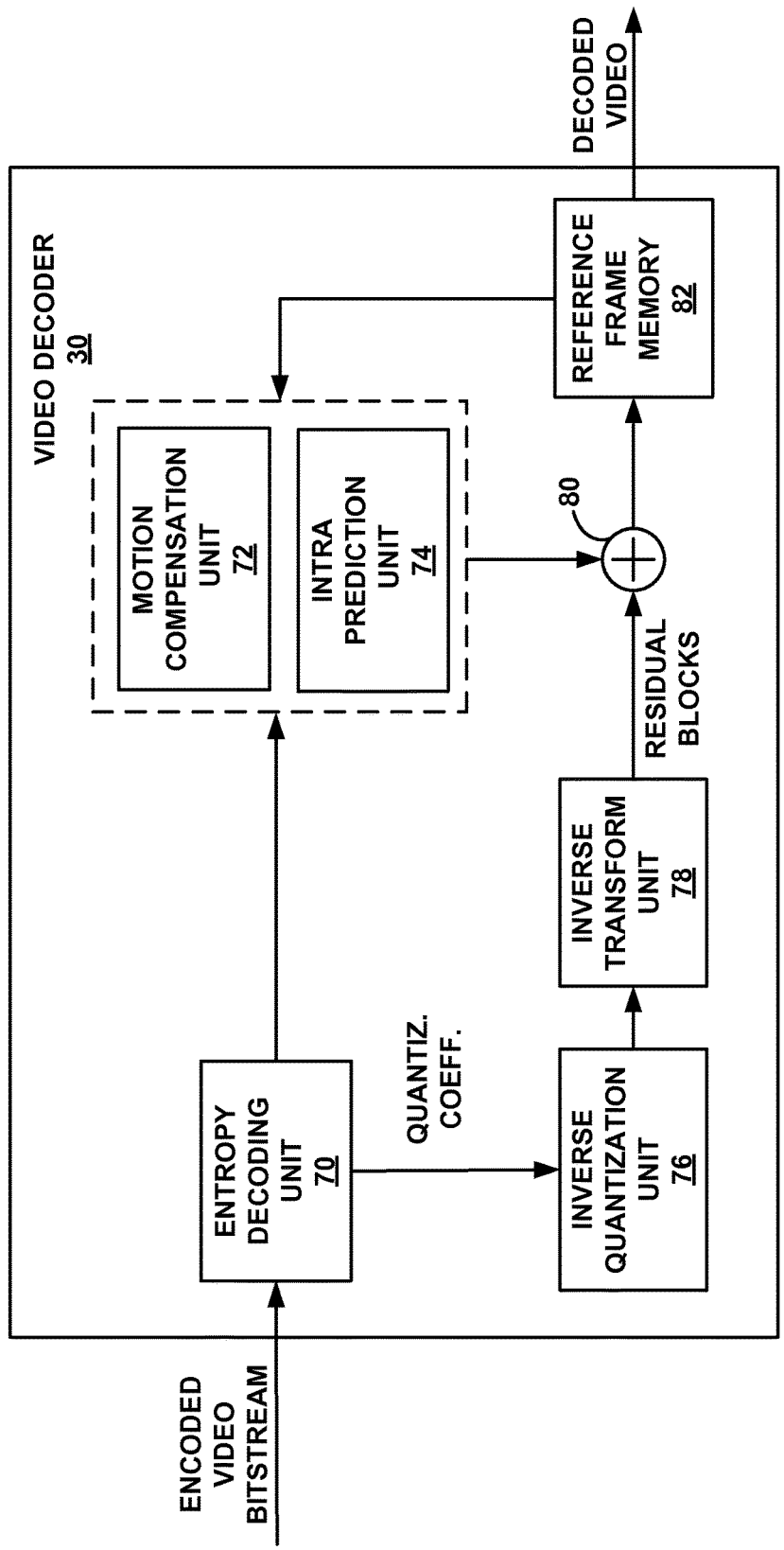
FIG. 3 is a block diagram illustrating one example of a video decoder consistent with the techniques of this disclosure.

FIG. 3 is a block diagram illustrating an example of video decoder 30, which decodes an encoded video sequence. In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70.

Motion compensation unit 72 may use motion vectors received in the bitstream, including motion vectors signaled in accordance with the techniques described herein, to identify a prediction block in one of the reference frames stored in reference frame memory 82. Intra prediction unit 74 may use intra prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, for example as defined by the H.264 decoding standard. The inverse quantization process may also include use of a quantization parameter $QP_Y$ calculated by encoder 50 for each macroblock to determine a degree of quantization and, likewise, a degree of inverse quantization that should be applied.

Entropy decoding unit 70 and inverse quantization unit 76 may also reconstruct jointly coded motion vector difference values by interpreting various syntax elements including flags and other values in the encoded bitstream. As an example, entropy decoding unit 70 and inverse quantization unit 76 may receive one or more values that represent whether the x- and/or y-components of a motion vector difference are greater than zero, a motion resolution flag, which may indicate the sub-pixel resolution of the motion vector, and a threshold value, which may indicate a maximum magnitude and/or resolution of the motion vector difference value. In one example, entropy decoding unit 70 may decode the jointly coded x- and y-components of the motion vector difference value using CABAC in the bypass mode. Using the bypass mode of CABAC may allow entropy coding unit 70 to decode the jointly coded motion vector difference values with increased throughput, relative to entropy decoding the x- and y-components of the motion vector difference values separately. Entropy decoding unit 70 and inverse quantization unit 76 may also receive one or more values that represent the sign of the x- and/or y-components of the motion vector difference value, and values that represent the absolute value of the magnitude of each component of the motion vector difference value. Entropy decoding unit 70 and inverse quantization unit 76 may use the values that represent whether the x- and y-components of motion vector difference values are greater than zero, as well as the values that represent the absolute value of the magnitude of each component of the motion vector difference value to reconstruct the amplitude, sign, precision, x- and y-components of motion vector difference values.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of macroblocks used to encode frame(s) of the encoded video sequence, partition information that describes how each macroblock of a frame of the encoded video sequence is partitioned, modes indicating how each partition is encoded, one or more reference frames (and reference frame lists) for each inter-encoded macroblock or partition, and other information to decode the encoded video sequence. As an example, motion compensation unit 72 may receive an MVD value and a motion vector predictor. Motion compensation unit 72 may further determine a calculated vector for a current block as a sum of the MVD value and the motion vector predictor of the current block. The calculated motion vector for the current block may further indicate the location of a prediction block. In some examples, motion compensation unit 72 may calculate pixel values for the prediction block, e.g., when the motion vector has sub-pixel precision, such as quarter- or eighth-pixel precision.

Summer 80 sums the residual blocks with the corresponding prediction blocks generated by motion compensation unit 72 or intra-prediction unit to form decoded blocks. If desired, a deblocking filter may also be applied to filter the decoded blocks in order to remove blockiness artifacts. The decoded video blocks are then stored in reference frame memory 82, which provides reference blocks for subsequent motion compensation and also produces decoded video for presentation on a display device (such as display device 32 of FIG. 1).

Based on the motion vector for the current block, motion compensation unit may determine a predictive block from one or more frame stored in reference frame memory 82. Motion compensation unit 72 may be needed to calculate sub-pixels of the predictive block that motion compensation unit 72 generates. The prediction blocks such as sub-pixels of reference frames, at various precisions, e.g. one-eighth and one-quarter sub-pixels. In order to interpolate sub-pixels, motion compensation unit 72 may utilize a variety of techniques. As examples, motion compensation unit 72 may utilize bilinear interpolation or utilize N-tap finite response filters (FIRs) to interpolate a sub-pixel. When a device such as motion compensation unit 72 calculates a value for a fractional pixel by averaging two pixels or sub-pixels, it may round, and/or scale the resulting value. In some cases, motion compensation unit 72 may average values for two sub-pixels which are the result of averaging to a sub-integer pixel Motion compensation unit 72 may calculate values for sub-integer pixel positions, such as one-eighth pixel positions, by applying interpolation filters to sets of support. Support generally refers to values for one or more reference pixels, e.g., pixels in a common line or region. The pixels may correspond to full pixel positions or sub-integer pixel positions that were previously calculated. In some examples, motion compensation unit 72 may calculate values for sub-integer pixels using bilinear interpolation, and may use similar bilinear interpolation filters to calculate values for two or more different sub-integer pixel positions by applying the one or more of the bilinear interpolation filters to different sets of support for the respective sub-integer pixel positions.

In some other cases, motion compensation unit 42 may utilize an N-tap finite response filter (FIR) to interpolate sub-pixel values. A FIR, such as a 6-tap or 12-tap Wiener filter, may utilize nearby support pixel values to interpolate a sub-integer pixel value. A support pixel is a pixel or sub-pixel value used as an input to the FIR. A FIR may have one or more dimensions. In a one-dimensional FIR, a device such as motion compensation unit 72 may apply a filter to a number of support pixels or sub-pixels in a line, for example, horizontally, vertically, or at an angle. In contrast to a one-dimensional FIR, which may use support pixels in a straight line, a two-dimensional FIR, may use nearby support pixels or sub-pixels which form a square or rectangle to compute the interpolated pixel value.

Video decoder 30 represents an example of a video encoder configured to decode video data representative of whether an absolute value of an x-component of a motion vector difference value for a current block of video data is greater than zero and to decode video data representative of whether an absolute value of a y-component of the motion vector difference value is greater than zero. Video decoder 30 may be configured to decode video data representative of the absolute value of the x-component of the motion vector difference value when the absolute value of the x-component of the motion vector difference value is greater than zero, and to decode video data representative of the absolute value of the y-component of the motion vector difference value when the absolute value of the y-component of the motion vector difference value is greater than zero. Video decoder 30 may also be configured to decode video data representative of a sign of the x-component of the motion vector difference value when the absolute value of the x-component of the motion vector difference value is greater than zero, and to decode a sign of the y-component of the motion vector difference value when the absolute value of the y-component of the motion vector difference value is greater than zero.

Figure 4:
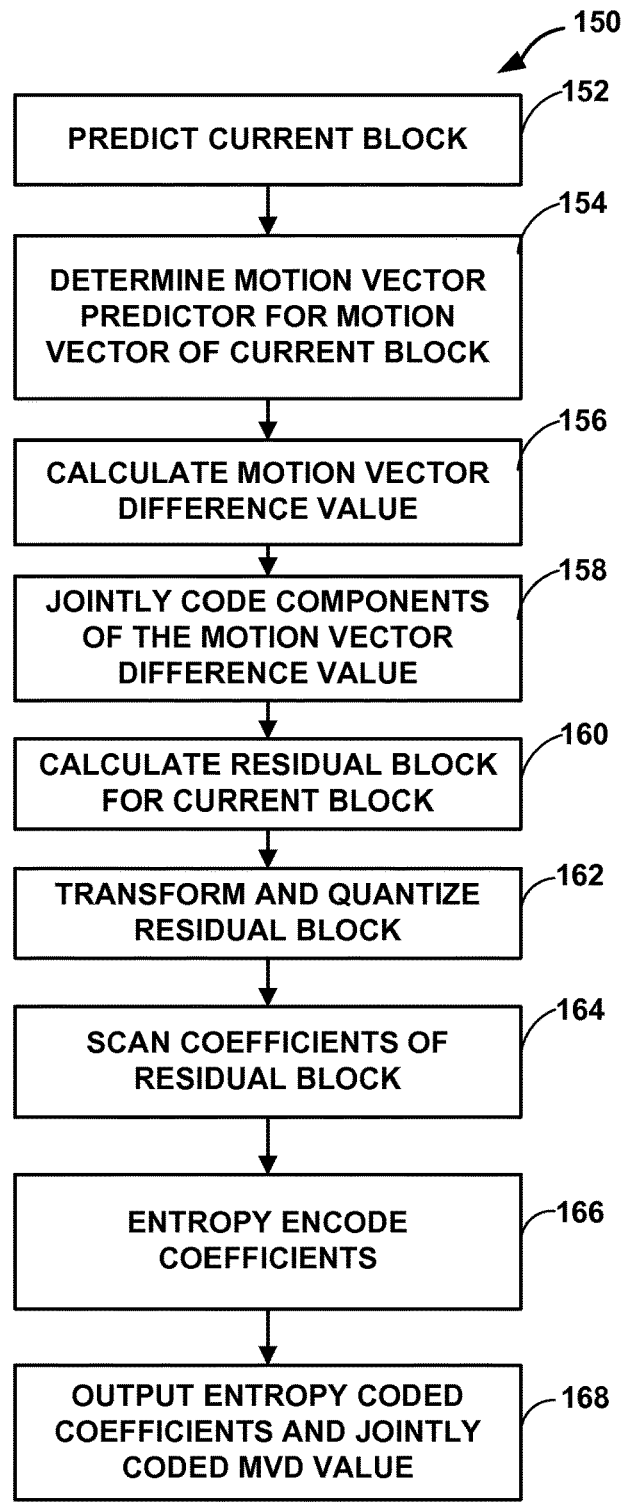
FIG. 4 is a flowchart illustrating an example method for jointly encoding the x- and y-components of a motion vector difference value and entropy coding a current block.

FIG. 4 is a flowchart illustrating an example method for jointly encoding the x- and y-components of a motion vector difference value and entropy coding a current block. In method 150, motion estimation unit 42 of video encoder 20 may predict a current block (152). As part of predicting the current block, motion estimation unit 42 may calculate a motion vector. The motion vector may indicate a displacement of a predictive block relative to the current block. The displacement of the motion vector may have x- and y-components, MV_x, and MV_y. The predictive block may closely match the current block in terms of pixel difference, which may be determined by sum of absolute difference (SAD), sum of square difference (SSD), or other difference metrics. In the case where the current frame is inter-predicted, the predictive block may comprise a block of a different frame, such as one of one or more reference frames in reference frame memory 64 of FIG. 2.

Motion compensation unit 44 or another unit of video encoder 20 may then determine a motion vector predictor for the motion vector of the current block (154). A motion vector predictor is a motion vector that motion compensation unit 44 uses to calculate motion vector difference values for the current block. In some examples, the motion vector predictor may be the motion vector of one of a plurality of blocks that neighbor the PU of the current block. Motion compensation unit 44 may also determine the motion vector predictor from a co-located block of one of the reference frames stored in reference frame memory 64. The motion vector predictor may have an x-component of p_x and a y-component of p_y. Video encoder 20 may determine the motion vector predictor such that the motion vector predictor minimizes the difference of the motion vector for the current block and the motion vector predictor.

Based on the motion vector predictor, motion compensation unit 44 of video encoder 20, or another unit of video encoder 20, such as entropy coding unit 56, may calculate a motion vector difference value for the current block (156). Motion compensation unit 44 may calculate the motion vector difference for the current block as a difference of the motion vector for the current block and the motion vector predictor for the current block. Thus, motion compensation unit 44 may calculate the motion vector predictor for the current block as <p_x−MV_x, p_y−MV_y>, where p_x and p_y are the x- and y-components of the motion vector predictor, and MV_x and MV_y are the x- and y-components of the motion vector for the current block.

Entropy coding unit 56 may then jointly code elements of the motion vector difference value for the current block (158). For example, entropy coding unit 56 may jointly code elements of the motion vector difference value, which include the x- and y-components of the motion vector difference as explained with respect to FIGS. 6 and 7 in greater detail below. The elements of the motion vector difference may also include one or more values representative of whether or not the x- and y-components of the motion vector difference are zero, a value representative of the sign value of the x- and/or y-components of the motion vector difference value, and a value representative of the absolute value of the component of the motion vector difference value, as some non-limiting examples.

Transform processing unit 52 or motion compensation unit 44 may calculate a residual block for the current block (160). The residual block may comprise pixel differences between the predictive video block, which is indicated by the motion vector for the current block, and the current video block. Transform processing unit 52 may then apply a transform, such as a discrete cosine transform (DCT), to the residual block for the current block, while quantization unit 54 may quantize the transform coefficients from transform processing unit 52 (162).

Entropy coding unit 56 may scan the transformed coefficients resulting from the transform of 162. In some cases, entropy coding unit 56 may apply a zig-zag scan or other scan pattern to scan the transform coefficients of the transformed residual block (164). Entropy coding unit 56 may entropy encode the coefficients comprising runs of zeros resulting from the scanning of 164, for example using run-length coding, for further compression (166). Entropy coding unit 56 may then output the entropy coded coefficients and the jointly coded MVD value (168). That is, entropy coding unit 56 may output jointly coded data for x- and y-components of the MVD value, in addition to entropy coded quantized transform coefficients.

The techniques of FIG. 4 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 4 are described with respect to a video coding device, which may include components substantially similar to those of video encoder 20 (FIGS. 1 and 2), although it should be understood that other devices may be configured to perform similar techniques. Moreover, the steps illustrated in FIG. 4 may be performed in a different order or in parallel, and additional steps may be added and certain steps omitted, without departing from the techniques of this disclosure.

Figure 5:
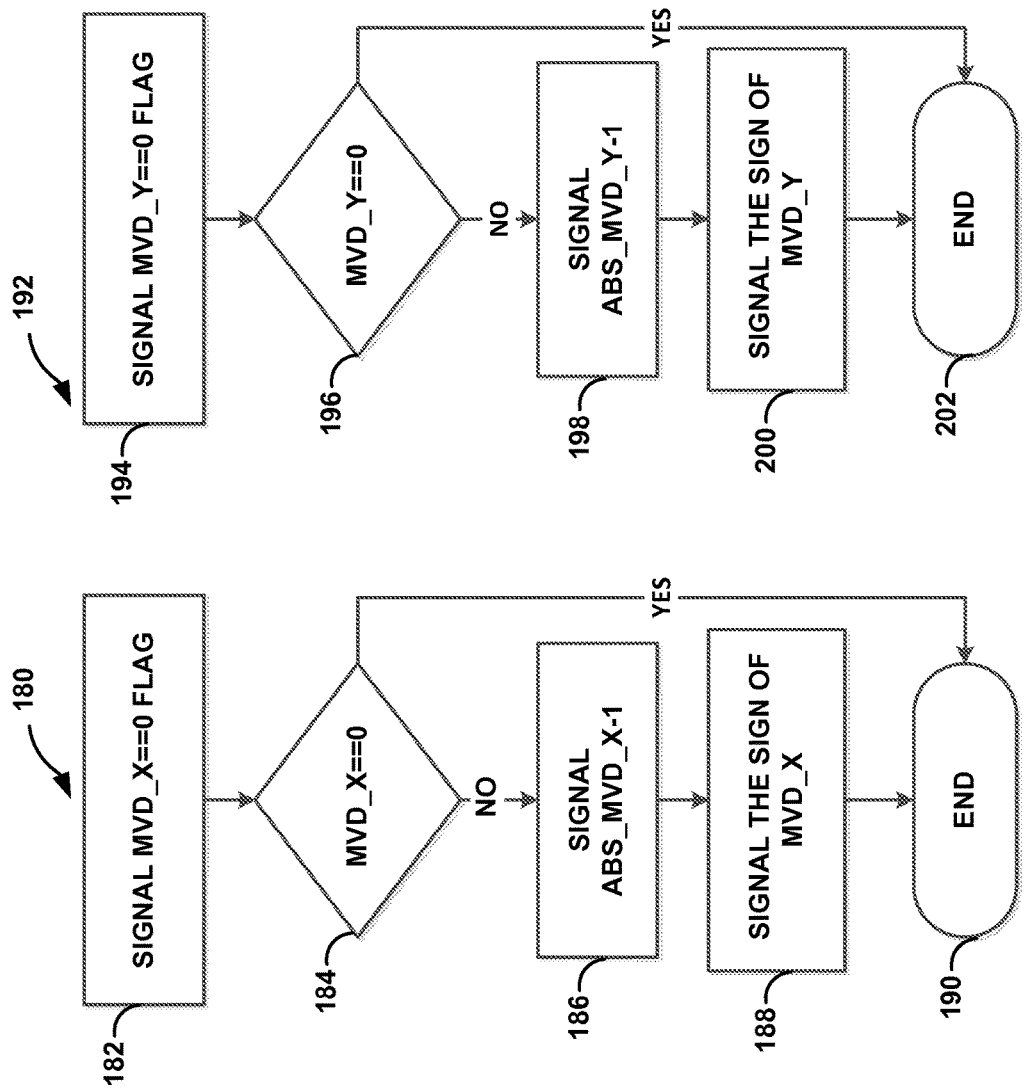
FIG. 5 is a flowchart illustrating an example method of separately signaling a motion vector difference value in accordance with HEVC test model 3.0 (HM 3.0).

FIG. 5 is a flowchart illustrating a method of separately signaling motion vector a motion vector difference value in accordance with the techniques described in HEVC test model 3.0 (HM3.0, also referred to as HM3). Techniques of HEVC are also described in document HCTVC-11003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9$^{th}$ Meeting: Geneva, Switzerland, Apr. 27, 2012 to May 7, 2012, which, as of Jun. 7, 2102, is downloadable from http://phenix.it-sudparis.eu/jct/doc_end_user/documents/9_Geneva/wg11/JCTVC-11003-v3.zip. According to the method proposed in HM3, and illustrated in FIG. 5, mvd_x and mvd_y values, corresponding the x- and y-components of a motion vector difference value, are signaled separately. Method 180 illustrates how one or more syntax elements related to mvd_x may be signaled, and method 192 illustrates how one or more syntax elements related to mvd_y may be signaled.

In method 180, a unit of video encoder 20, such as motion compensation unit 44 or entropy coding unit 56, may signal an mvd_x==0 flag (182). The mvd_x==0 flag represents whether the difference between the x-components of a calculated motion vector for a PU of a CU and a motion vector predictor for the motion vector are equal, and accordingly, whether the corresponding difference between the two x-components is equal to zero.

If the mvd_x==0 flag is set, then mvd_x, the x-component of the MVD, is equal to zero ("Yes" branch of 184), and the method ends (190). However, if mvd_x is nonzero ("No" branch of 184), video encoder 20 may signal abs_mvd_x−1 (186). Abs_mvd_x−1 may represent the absolute value of mvd_x value minus one. Video encoder 20 may further signal a value that represents the sign of mvd_x (188). The sign may be for example, positive or negative.

Similarly, in method 192, a video encoder, such as video encoder 20 of FIG. 1, may signal an mvd_y==0 flag (194). The mvd_y==0 flag represents whether the difference between the y-components of a calculated motion vector for a PU of a CU and a motion vector predictor for the motion vector are equal, and accordingly, whether the corresponding difference between the two y-components is equal to zero.

If the mvd_y==0 flag is set, then mvd_y, the y-component of the MVD, is equal to zero ("Yes" branch of 196), and the method ends (202). However, if mvd_y is nonzero ("No" branch of 196), video encoder 20 may signal abs_mvd_y−1 (198). Abs_mvd_y−1 may be a value that represents the absolute value of the mvd_y value minus one. Video encoder 20 may further signal a value that represents a sign of mvd_y (200). The sign may be for example, positive or negative.

Figure 6:
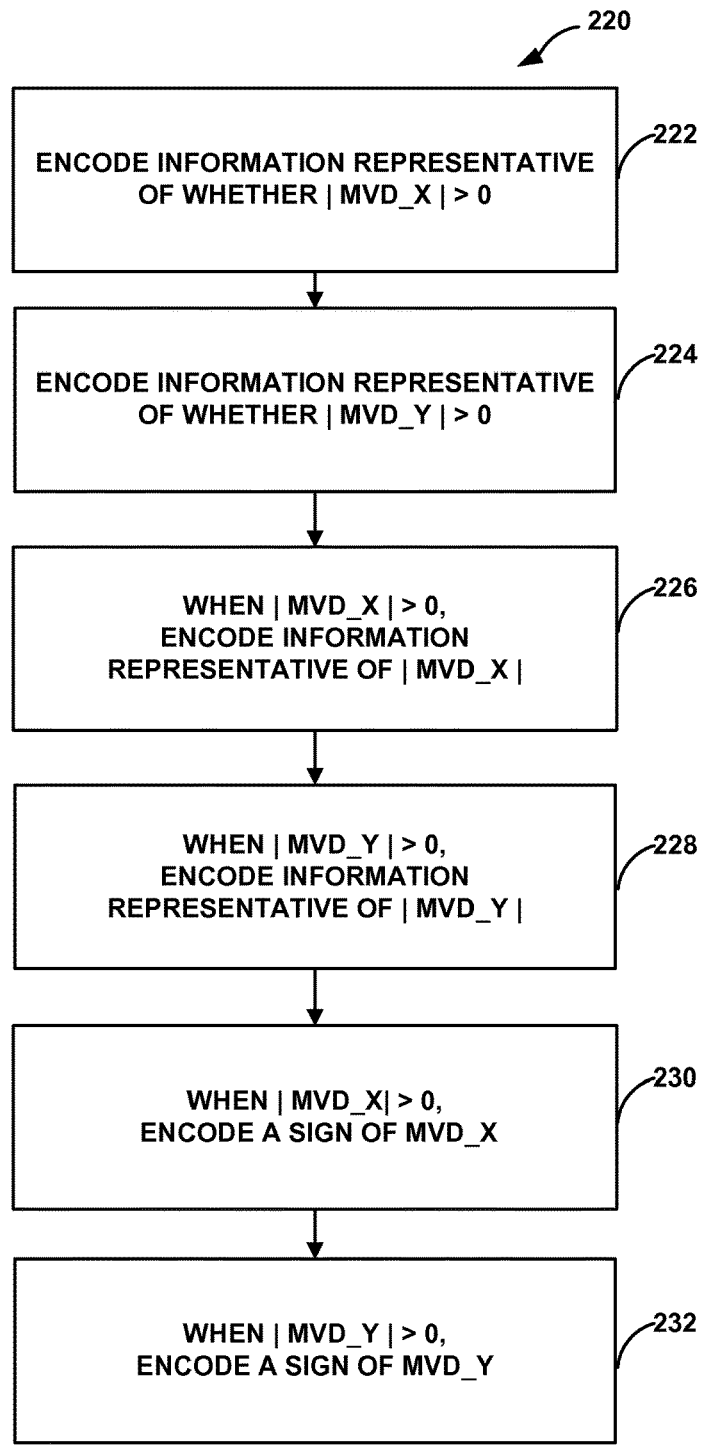
FIG. 6 is a flowchart illustrating an example method for jointly encoding the x- and y-components of a motion vector difference value.

FIG. 6 is a flowchart illustrating an example method 220 of jointly encoding motion vector difference values for jointly encoding the x- and y-components of a motion vector difference value. In general, method 220 of FIG. 6 corresponds to step 158 of FIG. 4. Thus, method 220 of FIG. 6 represents an example method for jointly coding data of x- and y-components of a motion vector difference value. Moreover, it is presumed that prior to performance of the example method of FIG. 6, motion compensation unit 44 of video encoder 20, or another unit of video encoder 20, such as entropy coding unit 56 of video encoder 20 may calculate a motion vector for the current block of video data and calculate the motion vector difference value as a difference between the motion vector for the current block of video data and a motion vector predictor determined for the current block of video data, e.g., as discussed with respect to step 156 of FIG. 4. To jointly code data for the x- and y-components of the motion vector difference value, entropy coding unit 56 may encode information representative of whether the absolute value of mvd_x, the x-component of the motion vector difference value, is greater than zero (222). Entropy coding unit 56 may then encode information representative of whether an absolute value of a y-component (mvd_y) of the motion vector difference value is greater than zero (224).

When the absolute value of the x-component of the motion vector difference value is greater than zero, entropy coding unit 56 may encode information representative of the absolute value of the x-component of the motion vector difference value (226). And when the absolute value of the y-component of the motion vector difference value is greater than zero, entropy coding unit 56 may encode information representative of the absolute value of the y-component of the motion vector difference value (228). In some examples, entropy coding unit 56 may encode the information representative of the absolute value of the x- and y-components of the motion vector difference values as the absolute values of mvd_x/2−1, and mvd_y/2−1, respectively.

When the absolute value of the x-component of the motion vector difference value is greater than zero, entropy coding unit 56 may encode a sign of the x-component of the motion vector difference value (230). When the absolute value of the y-component of the motion vector difference value is greater than zero, entropy coding unit 56 may encode a sign of the y-component of the motion vector difference value (232).

The techniques of FIG. 6 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 6 are described with respect to a video coding device, which may include components substantially similar to those of video encoder 20 (FIGS. 1 and 2), although it should be understood that other devices may be configured to perform similar techniques. Moreover, the steps illustrated in FIG. 6 may be performed in a different order or in parallel, and additional steps may be added and certain steps omitted, without departing from the techniques of this disclosure.

In this manner, the method of FIG. 6 represents an example of a method including coding information representative of whether an absolute value of an x-component of a motion vector difference value for a current block of video data is greater than zero, coding information representative of whether an absolute value of a y-component of the motion vector difference value is greater than zero, when the absolute value of the x-component of the motion vector difference value is greater than zero, coding information representative of the absolute value of the x-component of the motion vector difference value, when the absolute value of the y-component of the motion vector difference value is greater than zero, coding information representative of the absolute value of the y-component of the motion vector difference value, when the absolute value of the x-component of the motion vector difference value is greater than zero, coding a sign of the x-component of the motion vector difference value, and when the absolute value of the y-component of the motion vector difference value is greater than zero, coding a sign of the y-component of the motion vector difference value. Thus, the method of FIG. 6 represents an example of jointly coding elements of x- and y-components of a motion vector difference value calculated for a motion vector of a current block of video data.

Figure 7:
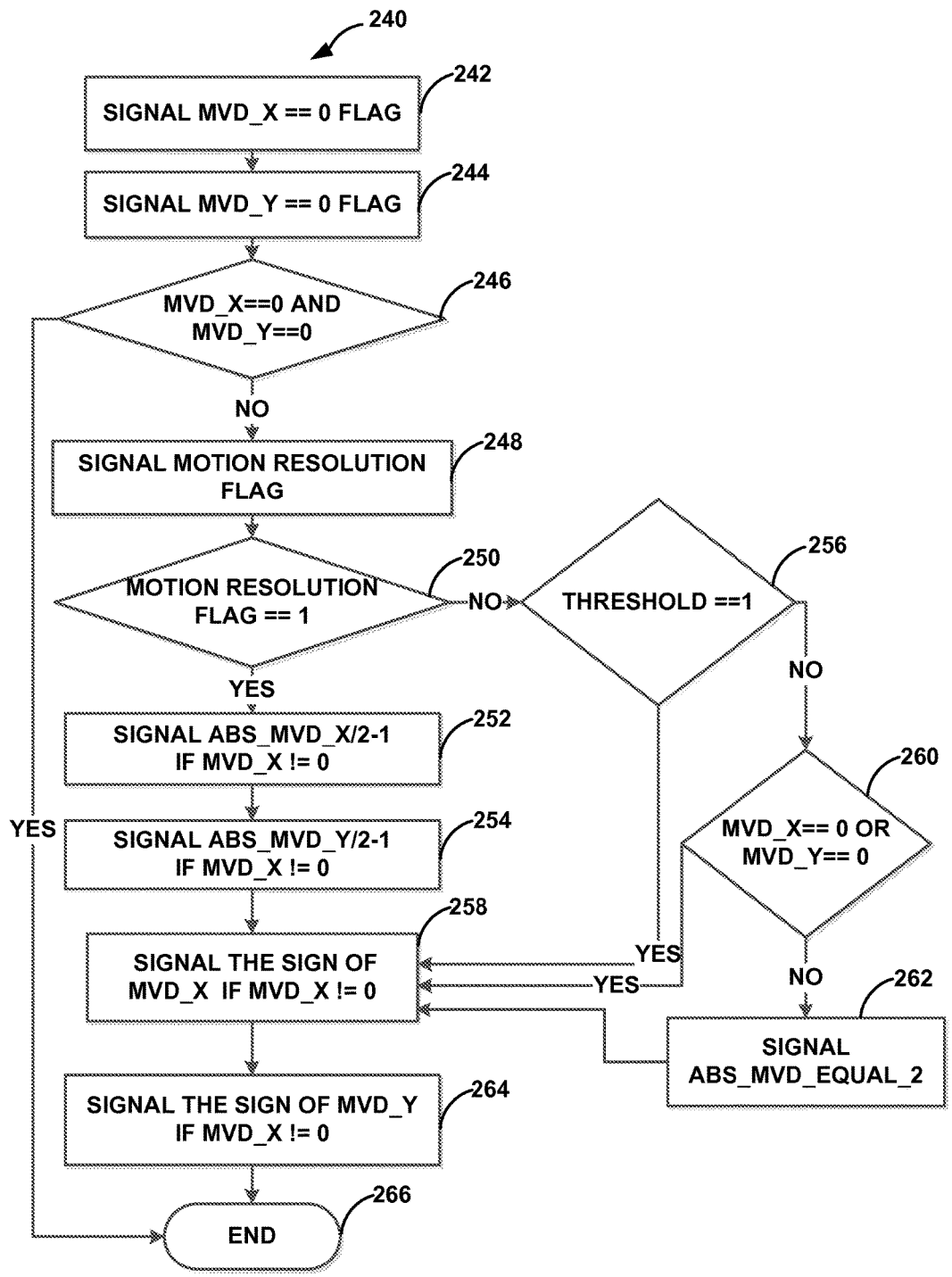
FIG. 7 is a flowchart illustrating an example method for jointly encoding the x- and y-components of a motion vector difference value and encoding the resolution of the x- and y-components of a motion vector difference value.

FIG. 7 is a flowchart illustrating a method for signaling values for mvd_x and mvd_y values. Unlike methods 180 and 192 of FIG. 5, which illustrate coding the x- and y-components of an MVD separately, and similar to the method of FIG. 6, the method of FIG. 7 may also allow an encoder to jointly encode the x- and y-components of a motion vector difference value, that is, mvd_x and mvd_y. In this example, one syntax element signaled in the bitstream by an encoder, such as video encoder 20 of FIGS. 1 and 2, may contain magnitude, sign and/or other information related to the x- and y-components of a motion vector difference value.

In the example of FIG. 7, as explained below, video encoder 20 may encode a motion resolution flag, which is a value representative of whether a motion vector of the current block of video data has a first sub-pixel precision, e.g., quarter-pixel precision, or a second sub-pixel precision, e.g., eighth-pixel precision. In this example, the motion resolution flag has a value of one to indicate that the motion vector of the current block has quarter-pixel precision, and has a value of zero to indicate that the motion resolution flag has eighth-pixel precision. Video encoder 20 may also encode a value, "abs_mvd_equal_2," which represents whether the magnitude of one or both of the components of the motion vector difference have an absolute value of two. Video encoder 20 may assign a value to abs_mvd_equal_2 based on the example of Table 1 below.

In the example of method 240 of FIG. 7, motion compensation unit 44 or another unit of video encoder 20 may signal an mvd_x==0 flag, (242) and an mvd_y==0 flag (244). These flags may be set when the corresponding mvd_x or mvd_y values are equal to zero. If both mvd_y and mvd_x are zero ("Yes" branch of 246), no further data need be signaled, and method 240 ends (266).

If either mvd_x or mvd_y are nonzero ("No" branch of 246), motion compensation unit 44 may signal or encode a motion resolution flag (246). The motion resolution flag (mvres_flag) is an example of a syntax element that may indicate a motion vector resolution (also referred to as motion vector precision) for a motion vector corresponding to the motion vector difference values. The motion resolution flag may indicate whether the motion vector of the current block of video data has a first sub-pixel precision or a second sub-pixel precision, e.g., one-quarter-pixel precision or one-eighth pixel precision.

Video encoder 20 may also determine a threshold for a current frame, which is also associated with the motion vector for the current block, and which may be signaled in the slice header or another data structure, e.g., a slice parameter set (SPS) or picture parameter set (PPS). The video encoder 20 may use the threshold to restrict the amplitude of eighth-pixel motion vector difference values and may indicate that the motion vector has the first sub-pixel precision when both the x-component of the motion vector difference value (mvd_x) and the y-component of the motion vector difference value (mvd_y) are greater than the threshold. For example, as shown below with respect to Table 1 below, the video encoder (e.g., video encoder 20) may restrict the magnitude of the x- and y-components of an eighth-pixel precision motion vector difference value to values of one or two. The video encoder may signal the value of the threshold using a threshold flag.

If the MVD calculated for an x- or y-component of a motion vector for a PU is greater than the determined threshold, the motion resolution flag may be set to true. If the motion resolution flag is set to true, the flag which represent that the motion vector has one-quarter-pixel precision. If the MVD value is less than or equal to the selected threshold, the video encoder may set a value for the motion resolution flag to indicate whether a corresponding motion vector has one-quarter or one-eighth pixel precision.

Method 240 may further comprise video encoder 20 determining whether the motion resolution flag is equal to one (250). The motion resolution flag may be equal to one, for example if the motion vector precision is one-quarter precision. If the motion resolution flag is set to one, video encoder 20 may signal or encode a value representative of the value abs_mvd_x/2−1 if mvd_x is nonzero, where abs_mvd_x is a value that represents is the absolute value of the x-component of the MVD (252). Video encoder 20 may similarly encode a value representative of abs_mvd_y/2−1 if mvd_x is nonzero, where abs_mvd_y is the absolute value of the y-component of the MVD (254). In some examples, video encoder 20 may signal abs_mvd_y/2−1 if mvd_y is nonzero, rather than if mvd_x is non-zero.

If the motion resolution flag is not equal to one ("No" branch of 250), video encoder 20 may determine whether the threshold is equal to one. The threshold can have a value of either one or two in this example. In an example, the threshold may have a value of two. Because the motion vector can only have eighth-pixel precision when the mvd_x and mvd_y values do not exceed the threshold, the values of mvd_x and mvd_y are restricted to one or two in this example. Moreover, if the threshold is equal to one ("Yes" branch of 256), and the motion vector has quarter-pixel precision (as indicated by the motion resolution flag, which in this example must be true following step 250), the video encoder need not signal any additional information for the mvd values. That is, the values of mvd_x and mvd_y can be determined to be either zero or one using other information. In particular, whether mvd_x and mvd_y are zero or one can be indicated based on whether sign values are signaled in steps 248 and 264. If the threshold is equal to two ("No" branch of 256), video encoder 20 may determine whether either of the mvd_x or mvd_y values are equal to zero. If mvd_x or mvd_y is equal to zero ("Yes" branch of 260), video encoder 20 may proceed to signaling the signs of the non-zero one of mvd_x and mvd_y (258, 264). In some examples, video encoder 20 may additionally signal a value for the non-zero one of mvd_x and mvd_y, and thus, instead may proceed to step 252, rather than 258.

However, if both mvd_x and mvd_y are nonzero, that is, neither mvd_x nor mvd_y has a value of zero ("No" branch of 260), then video encoder 20 may signal an abs_mvd_equal_2 flag. The abs_mvd_equal_2 flag is an example of a jointly coded value for mvd_x and mvd_y. A video encoder may assign a value to abs_mvd_equal_2 based on Table 1 below.

TABLE 1

| abs_mvd_equal_2 | abs_mvd_x | abs_mvd_y |
|---|---|---|
| 0 | 1 | 1 |
| 1 | 1 | 2 |
| 2 | 2 | 1 |

Based on the values of abs_mvd_x and abs_mvd_y, video encoder 20 may signal the value of abs_mvd_equal_2 (262), e.g., according to Table 1. Video encoder 20 may signal the value of abs_mvd_equal_2 using unary binarization. Video encoder 20 may further signal the sign of mvd_x if mvd_x is nonzero (258) and similarly signal the sign of mvd_y if mvd_x is nonzero (264). In some examples, video encoder 20 may signal the sign of mvd_y if mvd_y is nonzero.

In some examples, the motion resolution flag, mvd_x==0 flag, and mvd_y==0 flag are jointly coded. Optionally, and as one example, VLC codes may be used according to Table 2 below:

TABLE 2

| mvd_x == 0 | mvd_y == 0 | motion resolution flag | VLC codeword |
|---|---|---|---|
| true | true | x | 00 |
| true | false | 1 | 101 |
| true | false | 0 | 1110 |
| false | true | 1 | 100 |
| false | true | 0 | 110 |
| false | false | 0 | 1111 |
| false | false | 1 | 01 |

Video encoder 20 may signal the motion resolution flag to indicate one of one-quarter, and one-eighth pixel motion vector resolution. For example, video encoder 20 may signal the resolution of motion vector difference between $¼^{th}$ pel or $⅛^{th}$ pel. Video encoder 20 may signal the motion resolution flag to indicate a difference between one-quarter and one-eighth pixel motion vector precision when the MVD is smaller than a threshold value. Video encoder 20 may also signal the motion resolution flag to indicate a difference between one-quarter and one-eighth pixel motion vector precision when one or both of the components of the MVD is greater than a threshold value.

A video decoding device, such as video decoder 30 may operate in an essentially reciprocal manner to video encoder 20 to perform the techniques illustrated in FIG. 7. In this manner, video decoder 30 may adaptively select the motion vector accuracy for each motion vector, based on receiving and decoding a value that represents the motion vector, such as the motion resolution flag. Video decoder 30 may also receive and decode the threshold value from (256). Video decoder 30 may receive and decode the threshold value for each reference frame to restrict the amplitude of one-eighth sub-pixel motion vector difference values for the frame. The threshold may be received in the slice header. The threshold may have values of zero, one or two. The threshold is not restricted, and may be extended to other values. By coding information about the x- and y-components of motion vector difference values, the complexity of a coded video bitstream may be reduced, which may result in a lower overall bitrate for encoded video data.

In an example, a video coding device, such as video encoder 20 or video decoder 30 may code a value, such as the motion resolution flag of FIG. 7, which is representative of whether a motion vector of the current block of video data has a first sub-pixel precision or a second sub-pixel precision, such as one-quarter or one-eighth sub-pixel precision. The second sub-pixel precision may be greater than the first sub-pixel precision. When the motion vector has the second sub-pixel precision, e.g., one-eighth pixel precision, when the x-component of the motion vector difference value is not equal to zero, and when the y-component of the motion vector difference value is not equal to zero, the video encoder 20 or video decoder 30 may code information representative of the absolute value of the x-component of the motion vector difference value and code information representative of the absolute value of the y-component of the motion vector difference value. Video encoder 20 or video decoder 30 may code a jointly coded value representative of both the x-component of the motion vector difference value and the y-component of the motion vector difference value.

The techniques of FIG. 7 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 7 are described with respect to a video coding device, which may include components substantially similar to those of video encoder 20 (FIGS. 1 and 2). Video decoder 30 of FIGS. 1 and 3 may perform generally reciprocal operations of those illustrated and described in FIG. 7 to decode a bitstream encoded according to the techniques illustrated in FIG. 7. It should also be understood that other devices may be configured to perform similar techniques. Moreover, the steps illustrated in FIG. 7 may be performed in a different order or in parallel, and additional steps may be added and certain steps omitted, without departing from the techniques of this disclosure.

The method of FIG. 7 represents an example of a method including determining whether to use a motion vector having a first sub-pixel precision or a second sub-pixel precision to encode a prediction unit of a coding unit of video data, wherein the second sub-pixel precision is greater than the first sub-pixel precision, calculating an x-component and a y-component of the motion vector having either the first sub-pixel precision or the second sub-pixel precision based on the determination, when the x-component and the y-component have the second sub-pixel precision, determining motion vector difference values based on the values of the x-component and the y-component of the motion vector and values of a predicted x-component and a predicted y-component for the motion vector, and encoding a jointly coded value representative of the motion vector difference values for the x-component and the y-component for the motion vector.

A reciprocal method may be performed by a video decoder. The reciprocal method may, for example, include determining whether a motion vector of a prediction unit of a coding unit of video data has a first sub-pixel precision or a second sub-pixel precision using a value of a motion resolution flag for the motion vector, wherein the second sub-pixel precision is greater than the first sub-pixel precision, when the motion vector has the second sub-pixel precision, decoding a jointly coded value representative of motion vector difference values for an x-component and a y-component of the motion vector, and decoding the motion vector based on the motion vector difference values and values of a predicted x-component and a predicted y-component for the motion vector, and forming prediction data for the coding unit using the decoded motion vector.

Video encoder 20 or video decoder 30 may determine the resolution of the motion vector for the current block based on the threshold value illustrated in FIG. 7. More specifically, video encoder 20 or video decoder 30 may determine whether the motion vector for the current block has the first sub-pixel precision or the second sub-pixel precision by determining a threshold value associated with the motion vector. Video encoder 20 or video decoder 30 may determine that the motion vector has the first sub-pixel precision when both the x-component of a motion vector difference value of the current block and the y-component of the motion vector difference value are greater than the threshold.

When at least one of the x-component of the motion vector difference value and the y-component of the motion vector difference value is less than or equal to the threshold, video encoder 20 or video decoder 30 may determine whether the motion vector has the first sub-pixel precision or the second sub-pixel precision based on the value of the motion vector resolution flag.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 8:
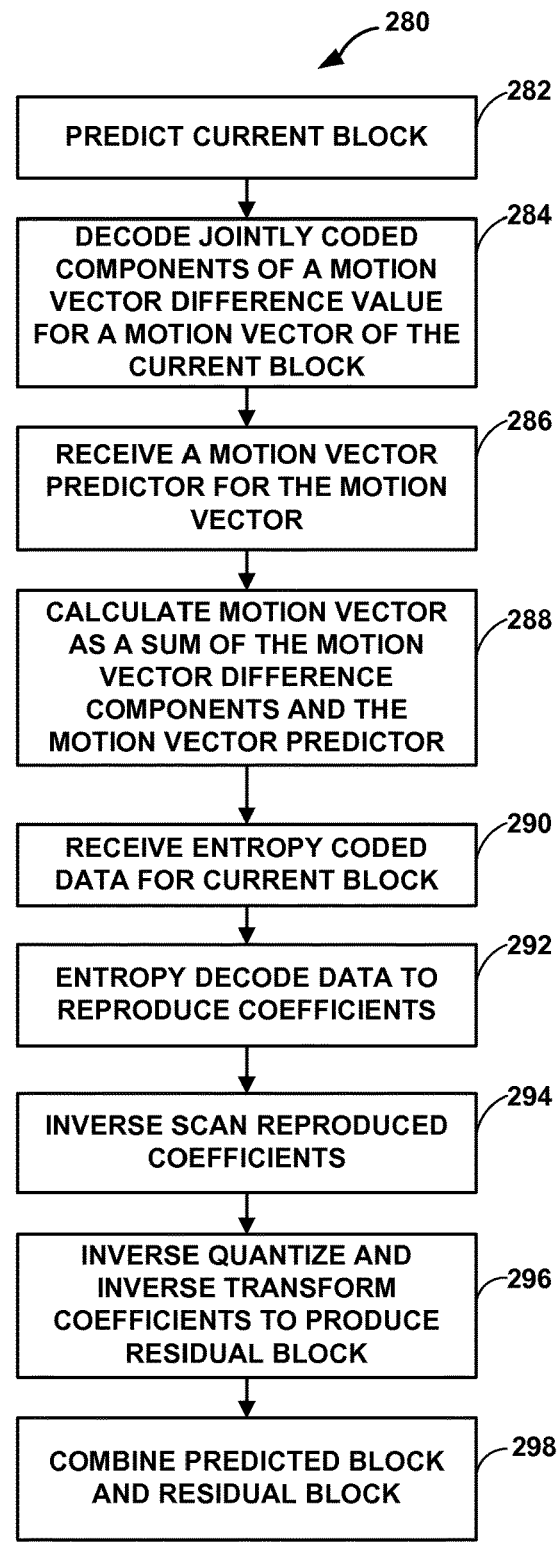
FIG. 8 is a flowchart illustrating an example method for jointly decoding the x- and y-components of a motion vector difference value and decoding entropy coded data to produce a current block.

FIG. 8 is a flowchart illustrating an example method for jointly decoding the x- and y-components of a motion vector difference value and decoding entropy coded data to produce a current block. The steps of method 280 of FIG. 8 are generally reciprocal to method 150 of FIG. 4. In method 280, motion compensation unit 72 or another unit of video decoder 30 may predict a current block (282). As part of predicting the current block, motion compensation unit 72 may decode jointly coded components of a motion vector difference value (284). Video decoder may decode the jointly coded components of the motion vector difference in accordance with the techniques of method 320 illustrated in FIG. 9. The motion vector difference value for the current block may have an x-component of mvd_x and a y-component of mvd_y. The jointly coded components of the motion vector difference value may include x- and y-components of the motion vector difference value for the current block, as well as other information related to the motion vector difference value, such as one or more values representative of whether or not the x- and y-components of the motion vector difference are zero, a value representative of the sign value of the x- and/or y-components of the motion vector difference value, and a value representative of the absolute value of the component of the motion vector difference value, as some non-limiting examples.

Motion compensation unit 44 of video encoder 20 may also receive a motion vector predictor for the motion vector of the current block (286). A motion vector predictor is a motion vector that motion compensation unit 72 uses to calculate motion vector difference values for the current block. In some examples, the motion vector predictor may be the motion vector of one of a plurality of blocks neighboring the PU of the current block. Motion compensation unit 72 may also determine the motion vector predictor from a co-located block of one of the reference frames stored in reference frame memory 82. The motion vector predictor may have an x-component of p_x and a y-component of p_y. The motion vector predictor may have been determined by video encoder 20 during the encoding phase such that the motion vector predictor minimizes the difference of the motion vector for the current block and the motion vector predictor. Based on the motion vector predictor, motion compensation unit 72 of video encoder 20 may calculate a motion vector for the current block (286). Video decoder 30 may calculate the motion vector as a sum of the motion vector difference components and the motion vector predictor, <p_x+mvd_x, p_y+mvd_y> (288).

Entropy decoding unit 70 may receive entropy coded data for the current block (290), and decode data, such as the transformed run-length coded coefficients of a block to reproduce the transformed coefficients of the block (292). Entropy decoding unit 70 may inverse scan the reproduced coefficients to re-arrange the coefficients from one or more one-dimensional vectors of coefficients into a two-dimensional block of transformed coefficients (294).

Inverse quantization unit 76 may inversely quantize the two-dimensional block of transform coefficients, and inverse transform unit 78 may inversely transform the coefficients inversely quantized coefficients to produce a block of non-transformed pixels (296). The residual block may comprise pixel differences between the predictive video block, which is indicated by the motion vector for the current block, and the current video block. Video decoder 30 may then combine the residual block with the predictive block to form the current block of the current frame (298).

The techniques of FIG. 8 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 8 are described with respect to a video decoding device, which may include components substantially similar to those of video decoder 30 (FIGS. 1 and 3), although it should be understood that other devices may be configured to perform similar techniques. Moreover, the steps illustrated in FIG. 8 may be performed in a different order or in parallel, and additional steps may be added and certain steps omitted, without departing from the techniques of this disclosure.

Figure 9:
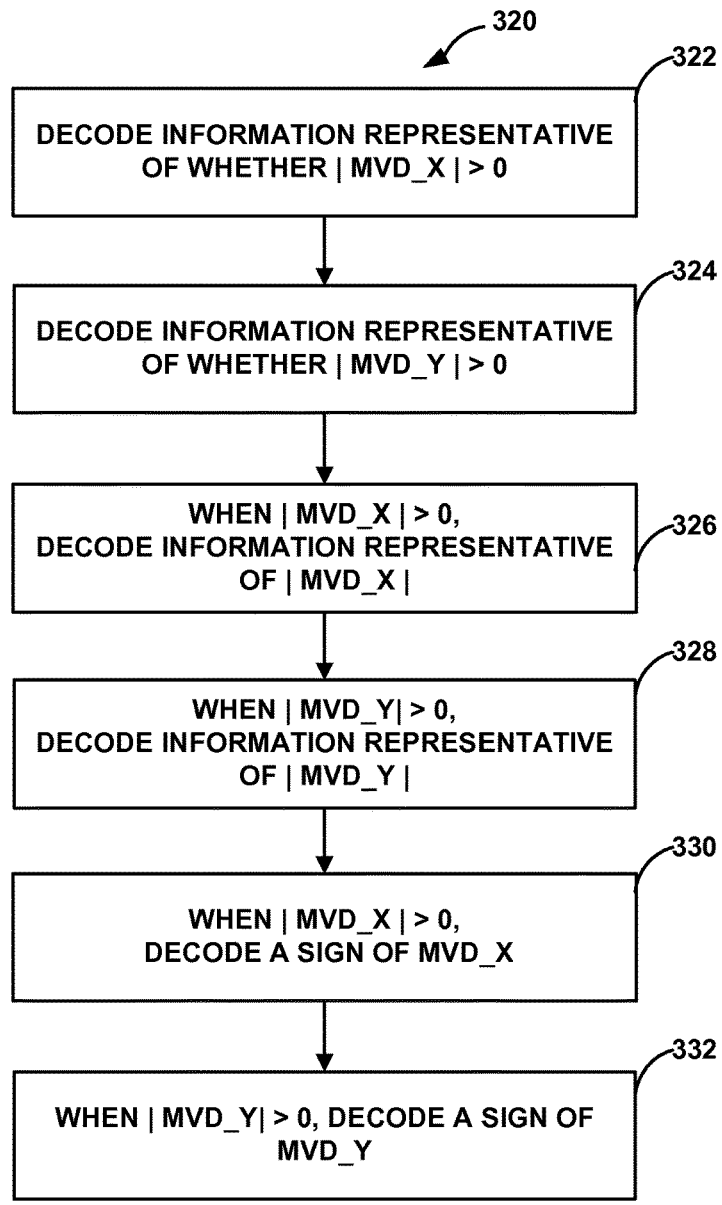
FIG. 9 is a flowchart illustrating an example method for jointly decoding the x- and y-components of a motion vector difference value.

FIG. 9 is a flowchart illustrating an example method for jointly decoding the x- and y-components of a motion vector difference value. The steps of method 320 of FIG. 9 are generally reciprocal to the steps of method 220 of FIG. 6. Likewise, method 320 may generally correspond to step 284 of FIG. 8. In method 320 of FIG. 9, motion compensation unit 72 of video decoder 30 or another unit of video decoder 30 may receive a jointly coded representation of a motion vector for the current block of video data. Video decoder 30 may also determine a motion vector predictor, which a video decoder, such as video encoder 20 may have previously determined and encoded. Video decoder 30 may calculate a motion vector for the current block as sum difference of the motion vector predictor for the current block of video data and the motion vector predictor determined for the current block of video data.

To determine the components of the motion vector difference value, motion compensation unit 72 of video decoder 30 may decode information representative of whether the absolute value of mvd_x, the x-component of the motion vector difference value, is greater than zero (322). Motion compensation unit 72 may then decode information representative of whether an absolute value of a y-component (mvd_y) of the motion vector difference value is greater than zero (324).

When the absolute value of the x-component of the motion vector difference value is greater than zero, motion compensation unit 72 may decode information representative of the absolute value of the x-component of the motion vector difference value (326). And when the absolute value of the y-component of the motion vector difference value is greater than zero, motion compensation unit 72 may decode information representative of the absolute value of the y-component of the motion vector difference value (328). In some examples, video decoder 30 may decode the information representative of the absolute value of the x- and y-components of the motion vector difference values as the absolute values of mvd_x/2−1, and mvd_y/2−1, respectively.

When the absolute value of the x-component of the motion vector difference value is greater than zero, motion compensation unit 72 may decode a sign of the x-component of the motion vector difference value (330). When the absolute value of the y-component of the motion vector difference value is greater than zero, motion compensation unit 72 may decode a sign of the y-component of the motion vector difference value (332).

The techniques of FIG. 9 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 9 are described with respect to a video coding device, which may include components substantially similar to those of video decoder 30 (FIGS. 1 and 3), although it should be understood that other devices may be configured to perform similar techniques. Moreover, the steps illustrated in FIG. 9 may be performed in a different order or in parallel, and additional steps may be added and certain steps omitted, without departing from the techniques of this disclosure.

In this manner, the method of FIG. 9 represents an example of a method including coding information representative of whether an absolute value of an x-component of a motion vector difference value for a current block of video data is greater than zero, coding information representative of whether an absolute value of a y-component of the motion vector difference value is greater than zero, when the absolute value of the x-component of the motion vector difference value is greater than zero, coding information representative of the absolute value of the x-component of the motion vector difference value, when the absolute value of the y-component of the motion vector difference value is greater than zero, coding information representative of the absolute value of the y-component of the motion vector difference value, when the absolute value of the x-component of the motion vector difference value is greater than zero, coding a sign of the x-component of the motion vector difference value, and when the absolute value of the y-component of the motion vector difference value is greater than zero, coding a sign of the y-component of the motion vector difference value. Thus, the method of FIG. 9 represents another example of a method for jointly coding data of a motion vector difference value. Moreover, video decoder 30 may also be configured to perform a video decoding method substantially similar to the method of FIG. 7. Certain techniques of this disclosure have been experimentally evaluated. Specifically, techniques of this disclosure related to adaptive sub-pixel precision signaling were implemented for HM3.0 and simulated under common test conditions. The performance is compared to HM3.0 anchor in terms of Bjontegaard Delta (BD) Bit Rate. Simulation results showed an average 0.4% BD-rate saving on the high efficiency configurations and an average 0.6% BD-rate saving on the low complexity configurations. Table 3 below summarizes the experimental results:

TABLE 3

|  | Random Access HE | | | Random Access LC | | |
| --- | --- | --- | --- | --- | --- | --- |
|  | Y | U | V | Y | U | V |
| Class A | 0.0 | −0.3 | 0.0 | 0.0 | −0.4 | −0.1 |
| Class B | −0.3 | −0.3 | −0.4 | −0.3 | −0.2 | −0.2 |

TABLE 3-continued

|         | | | | | | |
|---------|------|------|------|------|------|------|
| Class C | −0.5 | −0.4 | −0.3 | −0.6 | −0.7 | −0.7 |
| Class D | −0.9 | −0.7 | −1.0 | −1.3 | −0.9 | −1.0 |
| Class E | | | | | | |
| Overall | −0.4 | −0.4 | −0.4 | −0.6 | −0.6 | −0.5 |
| Enc Time[%] | | 110% | | | 116% | |
| Dec Time[%] | | 101% | | | 102% | |

|         | Low delay B HE | | | Low delay B LC | | |
|---------|------|------|------|------|------|------|
|         | Y | U | V | Y | U | V |
| Class A | | | | | | |
| Class B | −0.1 | 0.1 | −0.1 | −0.1 | −0.4 | −0.4 |
| Class C | −0.6 | −0.6 | −0.6 | −0.8 | −0.4 | −0.5 |
| Class D | −1.2 | −1.4 | −1.7 | −1.8 | 0.9 | 2.2 |
| Class E | 0.4 | −0.4 | −0.8 | 0.7 | 1.1 | 0.5 |
| Overall | −0.4 | −0.5 | −0.8 | −0.6 | 0.2 | 0.4 |
| Enc Time[%] | | 110% | | | 117% | |
| Dec Time[%] | | 101% | | | 103% | |

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of entropy coding video data, the method comprising:
when an absolute value of an x-component of a first motion vector difference value for a current block of video data is greater than zero, and when an absolute value of a y-component of the first motion vector difference value for the current block of video data is greater than zero, entropy coding, by a video coder, information representative of the first motion vector difference value, wherein entropy coding the information representative of the first motion vector difference value comprises:
coding, by the video coder, interleaved information from or into an encoded video bitstream, wherein the interleaved information includes information associated with the x-component of the first motion vector difference value and information associated with the y-component of the first motion vector difference value such that at least a first portion of the information associated with the y-component of the first motion vector difference value is coded before at least a first portion of the information associated with the x-component of the first motion vector difference value, and at least a second portion of the information associated with the x-component of the first motion vector difference value is coded before at least a second portion of the information associated with the y-component of the first motion vector difference value,
wherein the information associated with the x-component of the first motion vector difference value includes information indicative that the absolute value of the x-component of the first motion vector difference value for the current block of video data is greater than zero, information representative of the absolute value of the x-component of the first motion vector difference value, and a sign of the x-component of the first motion vector difference value, and wherein the information associated with the y-component of the first motion vector difference value includes information indicative that the absolute value of the y-component of the first motion vector difference value is greater than zero, information representative of the absolute value of the y-component of the first motion vector difference value, and a sign of the y-component of the first motion vector difference value.

2. The method of claim, 1, wherein entropy coding comprises context-adaptive binary arithmetic coding (CABAC) encoding, the method further comprising:
calculating a motion vector for the current block of video data; and
calculating the first motion vector difference value as a difference between the motion vector for the current block of video data and a motion vector predictor determined for the current block of video data.

3. The method of claim 1, wherein entropy coding comprises context-adaptive binary arithmetic coding (CABAC) decoding, the method further comprising:
determining a motion vector predictor for the current block of video data; and
calculating a motion vector for the current block of video data as a sum of the first motion vector difference value and the motion vector predictor.

4. The method of claim 1, further comprising:
coding a value representative of whether a motion vector of the current block of video data has a first sub-pixel precision or a second sub-pixel precision, wherein the second sub-pixel precision is greater than the first sub-pixel precision; and
coding a jointly coded value representative of both the x-component of the first motion vector difference value and the y-component of the first motion vector difference value when the motion vector has the second sub-pixel precision, when the x-component of the first motion vector difference value is not equal to zero, and when the y-component of the first motion vector difference value is not equal to zero.

5. The method of claim 4, further comprising:
determining whether the motion vector has the first sub-pixel precision or the second sub-pixel precision based on a threshold value associated with the motion vector; and
determining that the motion vector has the first sub-pixel precision when both the x-component of the first motion vector difference value and the y-component of the first motion vector difference value are greater than the threshold value.

6. The method of claim 4, further comprising:
determining whether the motion vector has the first sub-pixel precision or the second sub-pixel precision based on a value of a motion vector resolution flag when at least one of the x-component of the first motion vector difference value and the y-component of the first motion vector difference value is less than or equal to a threshold value associated with the motion vector.

7. The method of claim 4, wherein coding the value representative of whether the motion vector has the first sub-pixel precision or the second sub-pixel precision comprises coding a value for a motion vector resolution flag.

8. The method of claim 1, further comprising:
coding, from or into the encoded video bitstream, the absolute value of the x-component of the first motion vector difference value as mvd_x/2−1, wherein mvd_x comprises the x-component of the first motion vector difference value; and
coding, from or into the encoded video bitstream, the absolute value of the y-component of the first motion vector difference value as mvd_y/2−1, wherein mvd_y comprises the y-component of the first motion vector difference value.

9. An apparatus for entropy coding video data, the apparatus comprising:
a memory configured to store at least one reference picture; and
a video entropy coder configured to:
entropy code information representative of a first motion vector difference value for a motion vector of a current block relative to a predictive block of the at least one reference picture when an absolute value of an x-component of a first motion vector difference value is greater than zero and when an absolute value of a y-component of the first motion vector difference is greater than zero, wherein to entropy code the information representative of the first motion vector difference value, the apparatus for entropy coding is configured to:
code interleaved information from or into an encoded video bitstream, wherein the interleaved information includes information associated with the x-component of the first motion vector difference value and information associated with the y-component of the first motion vector difference value such that at least a first portion of the information associated with the y-component of the first motion vector difference value is coded before at least a first portion of the information associated with the x-component of the first motion vector difference value, and at least a second portion of the information associated with the x-component of the first motion vector difference value is coded before at least a second portion of the information associated with the y-component of the first motion vector difference value,
wherein the information associated with the x-component of the first motion vector difference value includes information indicative that the absolute value of the x-component of the first motion vector difference value for the current block is greater than zero, information representative of the absolute value of the x-component of the first motion vector difference value, and a sign of the x-component of the first motion vector difference value, and
wherein the information associated with the y-component of the first motion vector difference value includes information indicative that the absolute value of the y-component of the first motion vector difference value is greater than zero, information representative of the absolute value of the y-component of the first motion vector difference value, and a sign of the y-component of the first motion vector difference value.

10. The apparatus of claim 9, wherein the video entropy coder comprises a context-adaptive binary arithmetic coding (CABAC) video encoder, and wherein the CABAC video encoder is further configured to calculate a motion vector for the current block of video data and calculate the first motion vector difference value as a difference between the motion vector for the current block of video data and a motion vector predictor determined for the current block of video data.

11. The apparatus of claim 9, wherein the video entropy coder comprises a context-adaptive binary arithmetic coding (CABAC) video decoder, and wherein the CABAC video decoder is further configured to determine a motion vector predictor for the current block of video data and calculate a motion vector for the current block of video data as a sum of the first motion vector difference value and the motion vector predictor.

12. The apparatus of claim 9, wherein the video entropy coder is configured to code a value representative of whether a motion vector of the current block of video data has a first sub-pixel precision or a second sub-pixel precision, wherein the second sub-pixel precision is greater than the first sub-pixel precision, and wherein the video entropy coder is configured to code a jointly coded value representative of both the x-component of the first motion vector difference value and the y-component of the first motion vector difference value when the motion vector has the second sub-pixel precision, when the x-component of the first motion vector difference value is not equal to zero, and when the y-component of the first motion vector difference value is not equal to zero.

13. The apparatus of claim 12, wherein the video entropy coder is configured to:
determine whether the motion vector has the first sub-pixel precision or the second sub-pixel precision based on a threshold value associated with the motion vector, and
determine that the motion vector has the first sub-pixel precision when both the x-component of the first motion vector difference value and the y-component of the first motion vector difference value are greater than the threshold value.

14. The apparatus of claim 12, wherein the video entropy coder is configured to:
determine whether the motion vector has the first sub-pixel precision or the second sub-pixel precision based on a value of a motion vector resolution flag when at least one of the x-component of the first motion vector difference value and the y-component of the first motion vector difference value is less than or equal to the threshold.

15. The apparatus of claim 12, wherein to determine whether the motion vector has the first sub-pixel precision or the second sub-pixel precision, the video entropy coder is configured to determine whether the motion vector has the first sub-pixel precision or the second sub-pixel precision based on a value of a motion vector resolution flag.

16. The apparatus of claim 9,
wherein the apparatus for entropy coding is configured to code interleaved information from or into the encoded video bitstream by being configured to code, from or into the encoded video bitstream, the absolute value of the x-component of the first motion vector difference value as mvd_x/2−1, wherein mvd_x comprises the x-component of the first motion vector difference value; and
wherein the apparatus for entropy coding is configured to code interleaved information from or into the encoded video bitstream by being configured to code, from or into the encoded video bitstream, the absolute value of the y-component of the first motion vector difference value as mvd_y/2−1, wherein mvd_y comprises the y-component of the first motion vector difference value.

17. The apparatus of claim 9, wherein the apparatus comprises at least one of:
an integrated circuit;
a microprocessor; and
a wireless communication device that includes the video entropy coder.

18. An apparatus for entropy coding video data, the apparatus comprising:
means for entropy coding information representative of a first motion vector difference value when an absolute value of the x-component of the first motion vector difference value for a current block of video data is greater than zero and when an absolute value of the y-component of the first motion vector difference value for the current block of video data is greater than zero, wherein the means for entropy coding the information representative of the first motion vector difference value comprises:
means for coding interleaved information from or into an encoded video bitstream, wherein the interleaved information includes information associated with the x-component of the first motion vector difference value and information associated with the y-component of the first motion vector difference value such that at least a first portion of the information associated with the y-component of the first motion vector difference value is coded before at least a first portion of the information associated with the x-component of the first motion vector difference value, and at least a second portion of the information associated with the x-component of the first motion vector difference value is coded before at least a second portion of the information associated with the y-component of the first motion vector difference value,
wherein the information associated with the x-component of the first motion vector difference value includes information indicative that the absolute value of the x-component of the first motion vector difference value for the current block of video data is greater than zero, information representative of the absolute value of the x-component of the first motion vector difference value, and a sign of the x-component of the first motion vector difference value, and
wherein the information associated with the y-component of the first motion vector difference value includes information indicative that the absolute value of the y-component of the first motion vector difference value is greater than zero, information representative of the absolute value of the y-component of the first motion vector difference value, and a sign of the y-component of the first motion vector difference value.

19. The apparatus of claim 18, wherein the means for entropy coding comprises means for context-adaptive binary arithmetic coding (CABAC) encoding, the apparatus further comprising:
means for calculating a motion vector for the current block of video data; and means for calculating the first motion vector difference value as a difference between the motion vector for the current block of video data and a motion vector predictor determined for the current block of video data.

20. The apparatus of claim 18, wherein the means for entropy coding comprises means for context-adaptive binary arithmetic coding (CABAC) decoding, the apparatus further comprising:
means for determining a motion vector predictor for the current block of video data; and
means for calculating a motion vector for the current block of video data as a sum of the first motion vector difference value and the motion vector predictor.

21. The apparatus of claim 18, further comprising:
means for coding a value representative of whether a motion vector of the current block of video data has a first sub-pixel precision or a second sub-pixel precision, wherein the second sub-pixel precision is greater than the first sub-pixel precision; and
means for coding a jointly coded value representative of both the x-component of the first motion vector difference value and the y-component of the first motion vector difference value when the motion vector has the second sub-pixel precision, when the x-component of the first motion vector difference value is not equal to zero, and when the y-component of the first motion vector difference value is not equal to zero.

22. The apparatus of claim 21, wherein the means for determining whether the motion vector has the first sub-pixel precision or the second sub-pixel precision comprises means for determining a threshold value associated with the motion vector; and
means for determining that the motion vector has the first sub-pixel precision when both the x-component of the first motion vector difference value and the y-component of the first motion vector difference value are greater than the threshold value.

23. The apparatus of claim 22, wherein the means for determining whether the motion vector has the first sub-pixel precision or the second sub-pixel precision comprises means for determining whether the motion vector has the first sub-pixel precision or the second sub-pixel precision based on a value of a motion vector resolution flag when at least one of the x-component of the first motion vector difference value and the y-component of the first motion vector difference value is less than or equal the threshold value.

24. The apparatus of claim 21, wherein the means for coding the value representative of whether the motion vector has the first sub-pixel precision or the second sub-pixel precision comprises means for coding a value for a motion vector resolution flag.

25. The apparatus of claim 18,
wherein the means for coding interleaved information comprises means for coding, from or into the encoded video bitstream, the absolute value of the x-component of the first motion vector difference value as mvd_x/2−1, wherein mvd_x comprises the x-component of the first motion vector difference value; and
wherein the means for coding interleaved information comprises means for coding, from or into the encoded video bitstream, the absolute value of the y-component of the first motion vector difference value as mvd_y/2−1, wherein mvd_y comprises the y-component of the first motion vector difference value.

26. A non-transitory computer program product comprising a computer-readable storage medium having stored thereon instructions that, when executed, cause one or more processors of a device for coding video data to:
when an absolute value of an x-component of a first motion vector difference value for a current block of video data is greater than zero and an absolute value of a y-component of the first motion vector difference value for the current block of video data is greater than zero, entropy code information representative of the first motion vector difference value, wherein the instructions that cause the one or more processors to entropy code the information representative of the first motion vector difference value cause, when executed, the one or more processors to:
code interleaved information from or into an encoded video bitstream, wherein the interleaved information includes information associated with the x-component of the first motion vector difference value and information associated with the y-component of the first motion vector difference such that at least a first portion of the information associated with the y-component of the first motion vector difference value is coded before at least a first portion of the information associated with the x-component of the first motion vector difference value, and at least a second portion of the information associated with the x-component of the first motion vector difference value is coded before at least a second portion of the information associated with the y-component of the first motion vector difference value,
wherein the information associated with the x-component of the first motion vector difference value includes information indicative that the absolute value of the x-component of the first motion vector difference value for the current block of video data is greater than zero, information representative of the absolute value of the x-component of the first motion vector difference value, and a sign of the x-component of the first motion vector difference value, and
wherein the information associated with the y-component of the first motion vector difference value includes information indicative that the absolute value of the y-component of the first motion vector difference value is greater than zero, information representative of the absolute value of the y-component of the first motion vector difference value, and a sign of the y-component of the first motion vector difference value.

27. The non-transitory computer program product of claim 26, wherein the instructions that cause the one or more processors to entropy code comprise instructions that, when executed, cause the one or more processors to context-adaptive binary arithmetic coding (CABAC) encode, further comprising instructions that, when executed, cause the one or more processors to:
calculate a motion vector for the current block of video data; and
calculate the first motion vector difference value as a difference between the motion vector for the current block of video data and a motion vector predictor determined for the current block of video data.

28. The non-transitory computer program product of claim 26, wherein the instructions that cause the one or more processors to entropy code comprise instructions that, when executed, cause the one or more processors to context-adaptive binary arithmetic coding (CABAC) decode, further comprising instructions that, when executed, cause the one or more processors to:

determine a motion vector predictor for the current block of video data; and calculate a motion vector for the current block of video data as a sum of the first motion vector difference value and the motion vector predictor.

29. The non-transitory computer program product of claim 26, further comprising instructions that, when executed, cause the one or more processors to:

code a value representative of whether a motion vector of the current block of video data has a first sub-pixel precision or a second sub-pixel precision, wherein the second sub-pixel precision is greater than the first sub-pixel precision; and wherein the instructions that cause the one or more processors to code information representative of the absolute value of the x-component of the first motion vector difference value and code information representative of the absolute value of the y-component of the first motion vector difference value comprise instructions that, when executed, cause the one or more processors to jointly code a value representative of both the x-component of the first motion vector difference value and the y-component of the first motion vector difference value when the motion vector has the second sub-pixel precision, when the x-component of the first motion vector difference value is not equal to zero, and when the y-component of the first motion vector difference value is not equal to zero.

30. The non-transitory computer program product of claim 29, further comprising instructions that, when executed, cause the one or more processors to:

determine whether the motion vector has the first sub-pixel precision or the second sub-pixel precision based on a threshold value associated with the motion vector; and determine that the motion vector has the first sub-pixel precision when both the x-component of the first motion vector difference value and the y-component of the first motion vector difference value are greater than the threshold value.

31. The non-transitory computer product of claim 30, wherein the instructions that cause the one or more processors to determine whether the motion vector has the first sub-pixel precision or the second sub-pixel precision comprise instructions that, when executed, cause the one or more processors to, when at least one of the x-component of the first motion vector difference value and the y-component of the first motion vector difference value is less than or equal to the threshold, determine whether the motion vector has the first sub-pixel precision or the second sub-pixel precision based on a value of a motion vector resolution flag.

32. The non-transitory computer product of claim 29, wherein the instructions that cause the one or more processors to code the value representative of whether the motion vector has the first sub-pixel precision or the second sub-pixel precision comprise instructions that, when executed, cause the one or more processors to code a value for a motion vector resolution flag.

33. The non-transitory computer product of claim 26, wherein the instructions that cause the one or more processors to code interleaved information comprise instructions that, when executed, cause the one or more processors to code, from or into the encoded video bitstream, the absolute value of the x-component of the first motion vector difference value as mvd_x/2−1, wherein mvd_x comprises the x-component of the first motion vector difference value; and wherein the instructions that cause the one or more processors to code interleaved information comprise instructions that, when executed, cause the one or more processors to code, from or into the encoded video bitstream, the absolute value of the y-component of the first motion vector difference value as mvd_y/2−1, wherein mvd_y comprises the y-component of the first motion vector difference value.

* * * * *